(12) United States Patent
Sun et al.

(10) Patent No.: US 12,541,907 B2
(45) Date of Patent: Feb. 3, 2026

(54) GRAPHICS RENDERING METHOD, APPARATUS, AND STORAGE MEDIUM

(71) Applicant: Honor Device Co., Ltd., Shenzhen (CN)

(72) Inventors: Li Sun, Shenzhen (CN); Zhaoyang Yin, Shenzhen (CN); Wei Li, Shenzhen (CN); Jinxiao Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 150 days.

(21) Appl. No.: 18/293,573

(22) PCT Filed: Jun. 8, 2022

(86) PCT No.: PCT/CN2022/097714
§ 371 (c)(1),
(2) Date: Jan. 30, 2024

(87) PCT Pub. No.: WO2023/024649
PCT Pub. Date: Mar. 2, 2023

(65) Prior Publication Data
US 2024/0338880 A1   Oct. 10, 2024

(30) Foreign Application Priority Data

Aug. 24, 2021 (CN) .......................... 202110977666.2

(51) Int. Cl.
*G06T 15/00* (2011.01)

(52) U.S. Cl.
CPC .................. *G06T 15/005* (2013.01)

(58) Field of Classification Search
CPC ....... G06T 15/005; G06T 15/20; G06T 17/20; G06T 15/00; G06F 9/505; G06F 9/4856
See application file for complete search history.

(56) References Cited

U.S. PATENT DOCUMENTS

| 10,002,591 B2 | 6/2018 | Heo et al. |
| 2013/0127858 A1 | 5/2013 | Leroy et al. |

(Continued)

FOREIGN PATENT DOCUMENTS

| CN | 106560880 A | 4/2017 |
| CN | 108765534 A | 11/2018 |

(Continued)

OTHER PUBLICATIONS

Pellacini, Fabio, "User-Configurable Automatic Shader Simplification," Computer Graphics.SIGGRAPH 2000 Conference Proceedings, pp. 445-452 (Jul. 1, 2005).

(Continued)

*Primary Examiner* — Michelle Chin
(74) *Attorney, Agent, or Firm* — Leydig, Voit & Mayer, Ltd.

(57) ABSTRACT

Embodiments of this application relate to the field of image processing technologies, and provide a graphics rendering method, an apparatus, and a storage medium. A terminal device performs graphics rendering for an application by using a target shader. The terminal device obtains a target simplified shader when the terminal device determines that the application is run in a complex scene, where the complex scene is a scene in which a quantity of instructions for running the application is greater than a first preset threshold, and computing resources of the terminal device that are occupied by the target simplified shader are fewer. The terminal device performs graphics rendering for the application in the complex scene by using the target simplified shader. It is ensured that the application of the terminal device can still be run smoothly in the complex scene.

15 Claims, 13 Drawing Sheets

(56) References Cited

U.S. PATENT DOCUMENTS

| | | | |
|---|---|---|---|
| 2015/0005714 A1* | 1/2015 | Mehta | A61M 3/0279 |
| | | | 604/212 |
| 2020/0082491 A1 | 3/2020 | Harris | |
| 2020/0379815 A1 | 12/2020 | Banerjee et al. | |
| 2020/0380734 A1* | 12/2020 | Valient | G06T 1/20 |
| 2021/0042991 A1* | 2/2021 | Wei | G06T 15/20 |
| 2022/0254089 A1 | 8/2022 | Bao et al. | |

FOREIGN PATENT DOCUMENTS

| | | |
|---|---|---|
| CN | 109285211 A | 1/2019 |
| CN | 109389663 A | 2/2019 |
| CN | 111179150 A | 5/2020 |
| CN | 111417978 A | 7/2020 |
| CN | 112099884 A | 12/2020 |
| CN | 114443189 A | 5/2022 |
| WO | 2018050003 A1 | 3/2018 |

OTHER PUBLICATIONS

Song et al., "An Adaptive Method for Shader Simplification," 2011 International Conference on Virtual Reality and Visualization, pp. 46-51 (Nov. 4, 2011).

Sitthi-Amorn et al., "Genetic Programming for Shader Simplification," 2011 SIGGRAPH Asia Conference, 11 pages (Dec. 12, 2011).

Aaltonen, Sebastian, "Optimizing GPU occupancy and resource usage with large thread groups," Retrieved from the internet, URL: https://gpuopen.com/learn/optimizing-gpu-occupancy-resource-usage-large-thread-groups/ (May 24, 2017).

* cited by examiner

GRAPHICS RENDERING METHOD, APPARATUS, AND STORAGE MEDIUM

CROSS-REFERENCE TO RELATED APPLICATIONS

This application is a National Stage of International Application No. PCT/CN2022/097714, filed on Jun. 8, 2022, which claims priority to Chinese Patent Application No. 202110977666.2, filed on Aug. 24, 2021, both of which are hereby incorporated by reference in their entireties.

BACKGROUND

With development of computer graphics technologies and computer animation technologies, an application vendor uses a complex shader to improve an image quality, so as to draw a more realistic and refined scene of an application program. The shader is an editable program and may be configured to implement graphics rendering. Graphics rendering is a process in which a computer converts a shape stored in a memory into an image displayed on a screen.

When some applications in a terminal device are run in a complex scene, the shader may consume an excessive quantity of computing resources of a shader computing unit (for example, shader core) in a graphics processing unit (GPU). Consequently, the GPU cannot complete rendering within time of one frame, which causes freezing to the terminal device.

TECHNICAL FIELD

This application relates to the field of image processing technologies, and in particular, to a graphics rendering method, an apparatus, and a storage medium.

SUMMARY

Embodiments of this application relate to the field of image processing technologies, and provide a graphics rendering method, an apparatus, and a storage medium, to ensure that an application of the terminal device can still be run smoothly in a complex scene.

According to a first aspect, an embodiment of this application provides a graphics rendering method. The method includes: A terminal device performs graphics rendering for an application by using a target shader. The terminal device obtains a target simplified shader when the terminal device determines that the application is run in a complex scene, where the complex scene is a scene in which a quantity of instructions for running the application is greater than a first preset threshold, and computing resources of the terminal device that are occupied by the target simplified shader are fewer than computing resources of the terminal device that are occupied by the target shader. The terminal device performs graphics rendering for the application in the complex scene by using the target simplified shader.

According to this embodiment of this application, when the terminal device determines that the application is run in the complex scene, the terminal device obtains the target simplified shader, and performs graphics rendering for the application in the complex scene by using the target simplified shader. Because the computing resources of the terminal device that are occupied by the target simplified shader are fewer than the computing resources of the terminal device that are occupied by the target shader, it is ensured that the application of the terminal device can still be run smoothly in the complex scene.

In a possible implementation, that the terminal device obtains a target simplified shader includes: The terminal device obtains the target simplified shader based on a plurality of prestored correspondences, where the plurality of correspondences include a correspondence among information of a shader, hardware information of a device, and a simplified shader, and the information of the shader includes any one of the shader or an identifier of the shader.

In another possible implementation, that the terminal device obtains information of the target shader based on a plurality of prestored correspondences includes: The terminal device obtains, from the plurality of correspondences, the target simplified shader corresponding to the information of the target shader and hardware information of the terminal device. In this way, the terminal device can obtain a simplified shader that helps improve running performance of the terminal device during graphics rendering, based on the information of the shader and the hardware information of the device.

In another possible implementation, the correspondence further includes a load level, the load level is a quantified value corresponding to load of the terminal device, and that the terminal device obtains information of the target shader based on a plurality of prestored correspondences includes: The terminal device obtains a quantity of draw calls in the complex scene. The terminal device obtains a target load level based on the quantity of draw calls. The terminal device obtains, from the plurality of correspondences, the target simplified shader corresponding to the information of the target shader, the target load level, and hardware information of the terminal device. In this way, the terminal device can obtain a simplified shader that helps improve running performance of the terminal device during graphics rendering in the complex scene, based on the information of the shader, the target load level, and the hardware information of the device.

In another possible implementation, the method further includes: The terminal device simplifies the target shader based on a first preset rule, to obtain a plurality of simplified shaders, where the first preset rule includes at least one of code motion, expression deletion, or syntax simplification, and the plurality of simplified shaders include the target simplified shader. The terminal device collects status information that is of the terminal device and that exists when the terminal device performs graphics rendering for the application in the complex scene by using the plurality of simplified shaders, where the status information of the terminal device includes the load of the terminal device, power consumption of the terminal device, a temperature of the terminal device, a rendering duration, and an image quality of an image rendered by each simplified shader, and the rendering duration is a duration required for performing graphics rendering for the application in the complex scene by using each simplified shader. The terminal device obtains a correspondence among the information of the target shader, the hardware information of the terminal device, the target load level, and the target simplified shader based on the status information.

In this way, the terminal device can analyze, in advance, hardware information of the terminal device corresponding to the terminal device, and the status information that is of the terminal device and that exists when graphics rendering is performed for the application in the complex scene by using the plurality of simplified shaders corresponding to the target shader, and can obtain a target simplified shader with good performance based on the status information of the terminal device.

In another possible implementation, that the terminal device obtains a correspondence among the information of the target shader, the hardware information of the terminal device, the target load level, and the target simplified shader based on the status information includes: The terminal device obtains a plurality of target rendering durations from the status information, where the plurality of target rendering durations each are less than a second preset threshold. The terminal device obtains target status information from the status information corresponding to the plurality of target rendering durations, where an image quality in the target status information is greater than a third preset threshold, and the target status information is status information that is of the terminal device and that exists when graphics rendering is performed for the application in the complex scene by using the target simplified shader. The terminal device obtains the target load level based on load of the terminal device in the target status information. The terminal device establishes the correspondence among the information of the target shader, the hardware information of the terminal device, the target load level, and the target simplified shader.

In this way, the terminal device can first perform filtering based on rendering durations, then perform filtering based on image qualities of rendered images to obtain the target simplified shader, and establish the correspondence among the information of the target shader, the hardware information of the terminal device, the target load level, and the target simplified shader.

In a possible implementation, that the terminal device obtains a correspondence among the information of the target shader, the hardware information of the terminal device, the target load level, and the target simplified shader based on the status information includes: The terminal device obtains a plurality of target image qualities from the status information, where the plurality of target image qualities each are greater than a fourth preset threshold. The terminal device obtains target status information from the status information corresponding to the plurality of target image qualities, where a rendering duration in the target status information is less than a fifth preset threshold, and the target status information is status information that is of the terminal device and that exists when graphics rendering is performed for the application in the complex scene by using the target simplified shader. The terminal device obtains the target load level based on load of the terminal device in the target status information. The terminal device establishes the correspondence among the information of the target shader, the hardware information of the terminal device, the target load level, and the target simplified shader.

In this way, the terminal device can first perform filtering based on image qualities of rendered images, then perform filtering based on rendering durations to obtain the target simplified shader, and establish the correspondence among the information of the target shader, the hardware information of the terminal device, the target load level, and the target simplified shader.

In another possible implementation, the method further includes: The terminal device receives the plurality of correspondences sent by another device.

In another possible implementation, the another device simplifies a target shader based on a first preset rule, to obtain a plurality of simplified shaders, where the first preset rule includes at least one of code motion, expression deletion, or syntax simplification, and the plurality of simplified shaders include a target simplified shader. The another device collects status information that is of the another device and that exists when the another device performs graphics rendering for an application in a complex scene by using the plurality of simplified shaders, where the status information of the another device includes load of the another device, power consumption of the another device, a temperature of the another device, a rendering duration, and an image quality of an image rendered by each simplified shader, and the rendering duration is a duration required for performing graphics rendering for the application in the complex scene by using each simplified shader. The another device obtains a correspondence among information of the target shader, hardware information of the another device, a target load level, and the target simplified shader based on the status information. The another device sends the obtained correspondence to the terminal device.

In another possible implementation, that the another device obtains a correspondence among information of the target shader, hardware information of the another device, a target load level, and the target simplified shader based on the status information includes: The another device obtains a plurality of target rendering durations from the status information, where the plurality of target rendering durations each are less than a second preset threshold. The another device obtains target status information from status information corresponding to the plurality of target rendering durations, where an image quality in the target status information is greater than a third preset threshold, and the target status information is status information that is of the another device and that exists when graphics rendering is performed for the application in the complex scene by using the target simplified shader. The another device obtains the target load level based on load of the another device in the target status information. The another device establishes the correspondence among the information of the target shader, the hardware information of the another device, the target load level, and the target simplified shader.

In this way, the another device can first perform filtering based on rendering durations, then perform filtering based on image qualities of rendered images to obtain the target simplified shader, and establish the correspondence among the information of the target shader, the hardware information of the another device, the target load level, and the target simplified shader.

In another possible implementation, that the another device obtains a correspondence among information of the target shader, hardware information of the another device, a target load level, and the target simplified shader based on the status information includes: The another device obtains a plurality of target image qualities from the status information, where the plurality of target image qualities each are greater than a fourth preset threshold. The another device obtains target status information from the status information corresponding to the plurality of target image qualities, where a rendering duration in the target status information is less than a fifth preset threshold, and the target status information is status information that is of the another device and that exists when graphics rendering is performed for the application in the complex scene by using the target simplified shader. The another device obtains the target load level based on load of the another device in the target status information. The another device establishes the correspondence among the information of the target shader, the hardware information of the another device, the target load level, and the target simplified shader.

In another possible implementation, that the terminal device obtains a target simplified shader includes: The terminal device simplifies the target shader based on a first preset rule, to obtain the target simplified shader, where the first preset rule includes at least one of code motion, expression deletion, or syntax simplification.

In another possible implementation, that the terminal device obtains a target simplified shader when the terminal device determines that the application is run in a complex scene includes: The terminal device obtains the target simplified shader when the terminal device determines that the application is run in the complex scene, and a code complexity of the target shader is greater than a sixth preset threshold, or a quantity of invocations of the target shader is greater than a seventh preset threshold.

According to a second aspect, an embodiment of this application provides a terminal device, including a processing module. The processing module is configured to: perform graphics rendering for an application by using a target shader; obtain a target simplified shader when it is determined that the application is run in a complex scene, where the complex scene is a scene in which a quantity of instructions for running the application is greater than a first preset threshold, and computing resources of the terminal device that are occupied by the target simplified shader are fewer than computing resources of the terminal device that are occupied by the target shader; and perform graphics rendering for the application in the complex scene by using the target simplified shader.

Optionally, the processing module is specifically configured to obtain the target simplified shader based on a plurality of prestored correspondences, where the plurality of correspondences include a correspondence among information of a shader, hardware information of a device, and a simplified shader, and the information of the shader includes any one of the shader or an identifier of the shader.

Optionally, the processing module is specifically configured to obtain, from the plurality of correspondences, the target simplified shader corresponding to information of the target shader and hardware information of the terminal device.

Optionally, the correspondence further includes a load level, the load level is a quantified value corresponding to load of the device, and the processing module is specifically configured to: obtain a quantity of draw calls in the complex scene; obtain a target load level based on the quantity of draw calls; and obtain, from the plurality of correspondences, the target simplified shader corresponding to information of the target shader, the target load level, and hardware information of the terminal device.

Optionally, the processing module is further configured to: simplify the target shader based on a first preset rule, to obtain a plurality of simplified shaders, where the first preset rule includes at least one of code motion, expression deletion, or syntax simplification, and the plurality of simplified shaders include the target simplified shader; collect status information that is of the terminal device and that exists when the terminal device performs graphics rendering for the application in the complex scene by using the plurality of simplified shaders, where the status information of the terminal device includes load of the terminal device, power consumption of the terminal device, a temperature of the terminal device, a rendering duration, and an image quality of an image rendered by each simplified shader, and the rendering duration is a duration required for performing graphics rendering for the application in the complex scene by using each simplified shader; and obtain a correspondence among the information of the target shader, the hardware information of the terminal device, the target load level, and the target simplified shader based on the status information.

Optionally, the processing module is specifically configured to: obtain a plurality of target rendering durations from the status information, where the plurality of target rendering durations each are less than a second preset threshold; obtain target status information from the status information corresponding to the plurality of target rendering durations, where an image quality in the target status information is greater than a third preset threshold, and the target status information is status information that is of the terminal device and that exists when graphics rendering is performed for the application in the complex scene by using the target simplified shader; obtain the target load level based on load of the terminal device in the target status information; and establish the correspondence among the information of the target shader, the hardware information of the terminal device, the target load level, and the target simplified shader.

Optionally, the processing module is specifically configured to: obtain a plurality of target image qualities from the status information, where the plurality of target image qualities each are greater than a fourth preset threshold; obtain target status information from the status information corresponding to the plurality of target image qualities, where a rendering duration in the target status information is less than a fifth preset threshold, and the target status information is status information that is of the terminal device and that exists when graphics rendering is performed for the application in the complex scene by using the target simplified shader; obtain the target load level based on load of the terminal device in the target status information; and establish the correspondence among the information of the target shader, the hardware information of the terminal device, the target load level, and the target simplified shader.

Optionally, the terminal device further includes a communication module, configured to receive the plurality of correspondences sent by another device.

Optionally, the processing module is specifically configured to simplify the target shader based on a first preset rule, to obtain the target simplified shader, where the first preset rule includes at least one of code motion, expression deletion, or syntax simplification.

Optionally, when the terminal device determines that the application is run in the complex scene, the processing module is specifically configured to obtain the target simplified shader when it is determined that the application is run in the complex scene, and a code complexity of the target shader is greater than a sixth preset threshold, or a quantity of invocations of the target shader is greater than a seventh preset threshold.

According to a third aspect, an embodiment of this application provides a server, including a processing module. The processing module is configured to: simplify a target shader based on a first preset rule, to obtain a plurality of simplified shaders, where the first preset rule includes at least one of code motion, expression deletion, or syntax simplification, and the plurality of simplified shaders include a target simplified shader; collect status information that is of a terminal device and that exists when the terminal device performs graphics rendering for an application in a complex scene by using the plurality of simplified shaders, where the status information of the terminal device includes load of the terminal device, power consumption of the terminal device, a temperature of the terminal device, a rendering duration, and an image quality of an image rendered by each simplified shader, and the rendering duration is a duration required for performing graphics rendering for the application in the complex scene by using each simplified shader; and obtain a correspondence among information of the target shader, hardware information of the terminal device, a target load level, and the target simplified shader based on the status information.

Optionally, the processing module is specifically configured to: obtain a plurality of target rendering durations from the status information, where the plurality of target rendering durations each are less than a second preset threshold; obtain target status information from the status information corresponding to the plurality of target rendering durations, where an image quality in the target status information is greater than a third preset threshold, and the target status information is status information that is of the terminal device and that exists when graphics rendering is performed for the application in the complex scene by using the target simplified shader; obtain the target load level based on load of the terminal device in the target status information; and establish the correspondence among the information of the target shader, the hardware information of the terminal device, the target load level, and the target simplified shader.

Optionally, the processing module is specifically configured to: obtain a plurality of target image qualities from the status information, where the plurality of target image qualities each are greater than a fourth preset threshold; obtain target status information from the status information corresponding to the plurality of target image qualities, where a rendering duration in the target status information is less than a fifth preset threshold, and the target status information is status information that is of the terminal device and that exists when graphics rendering is performed for the application in the complex scene by using the target simplified shader; obtain the target load level based on load of the terminal device in the target status information; and establish the correspondence among the information of the target shader, the hardware information of the terminal device, the target load level, and the target simplified shader.

Optionally, the server further includes a communication module, configured to send a plurality of correspondences to the terminal device.

According to a fourth aspect, an embodiment of this application provides a computer-readable storage medium. The computer-readable storage medium stores a computer program or instructions. When the computer program or the instructions are run on a computer, the computer is enabled to perform the graphics rendering method according to any one of the first aspect or the possible implementations of the first aspect.

According to a fifth aspect, an embodiment of this application provides a computer program product including a computer program. When the computer program is run on a computer, the computer is enabled to perform the graphics rendering method according to any one of the first aspect or the possible implementations of the first aspect.

According to a sixth aspect, this application provides a chip or a chip system. The chip or the chip system includes at least one processor and a communication interface. The communication interface and the at least one processor are interconnected through a line. The at least one processor is configured to run a computer program or instructions, to perform the graphics rendering method according to any one of the first aspect or the possible implementations of the first aspect. The communication interface in the chip may be an input/output interface, a pin, a circuit, or the like.

In a possible implementation, the chip or the chip system according to this application further includes at least one memory. The at least one memory stores instructions. The memory may be a storage unit, for example, a register or a cache, inside the chip or may be a storage unit (for example, a read-only memory or a random access memory) of the chip.

It should be understood that technical solutions of the second aspect to the sixth aspect of this application correspond to the technical solutions of the first aspect of this application, and beneficial effects achieved in the aspects and corresponding feasible implementations are similar. Details are not described again.

DESCRIPTION OF EMBODIMENTS

Figure 1:
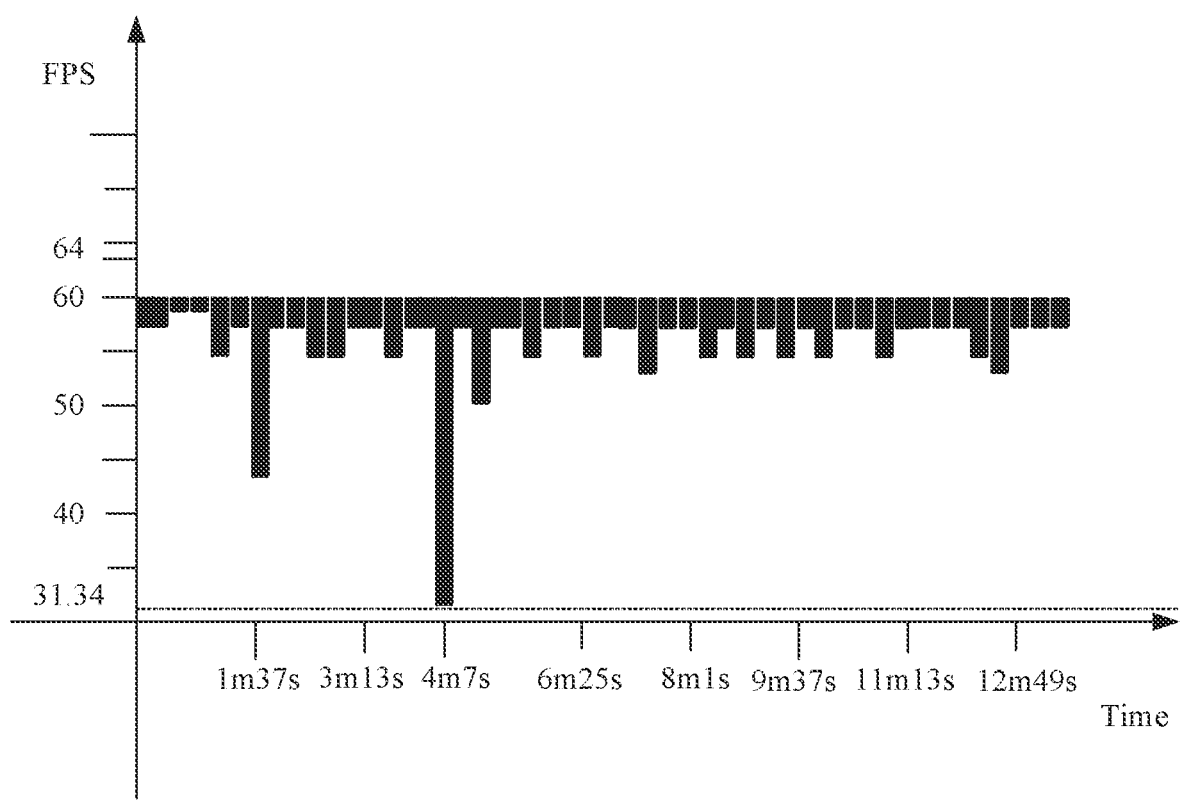
FIG. 1 is a schematic diagram of a correspondence that is between a frame rate and a running time and to which an embodiment of this application is applicable.

To describe the technical solutions in embodiments of this application more clearly, the following briefly describes some terms and technologies used in embodiments of this application.

(1) Frame and Frame Rate

A frame is a single image that is a smallest unit of interface display. One frame may be understood as one still image, and displaying a plurality of consecutive frames rapidly and continuously can create an illusion that an object moves.

A frame rate is a quantity of frames of images refreshed within 1 second, or may be understood as a quantity of times a GPU in a terminal device refreshes an image per second. A high frame rate can result in a smoother and more realistic animation. More frames per second indicate a smoother displayed action.

It should be noted that processes such as drawing, rendering, composition, and the like usually need to be performed before an interface displays a frame.

(2) Frame Drawing

Frame drawing is image drawing for a display interface. The display interface may include one or more views. Each view may be drawn by a visual control of a view system. Each view includes sub-views. One sub-view corresponds to one part in the view. For example, one sub-view of an image view corresponds to one symbol in the image view.

(3) Frame Rendering (Also Referred to as Graphic Rendering)

Frame rendering is performing an operation of shading, adding a 3D effect, or the like on a drawn view. For example, 3D effects may be a lighting effect, a shadow effect, a texture effect, and the like.

(4) Shader

A shader is an editable program and may be run on a GPU to implement graphics rendering. The shader includes a vertex shader, a pixel shader, a fragment shader, a geometry shader, a compute shader, and the like.

(5) Hardware Information and Scene Complexity

In embodiments of this application, hardware information may include a type of a chip or performance of a chip, for example, at least one of the following information: a central processing unit (CPU) frequency, a GPU frequency, or the like.

A scene complexity may be indicated by a quantity of draw calls in a scene. The draw call is a command for a CPU to invoke an underlying graphics drawing interface. The draw call is used for the terminal device to perform tasks such as detecting a rendering status, submitting rendering data, and submitting the rendering status.

(6) Other Terms

The terms such as "first" and "second" are used in embodiments of this application to distinguish between same items or similar items that provide basically same functions or purposes. For example, a first chip and a second chip are merely intended to distinguish between different chips, and are not intended to limit a sequence thereof. A person skilled in the art may understand that the words such as "first" and "second" do not limit a quantity or an execution sequence, and the words such as "first" and "second" do not indicate a definite difference.

It should be noted that in embodiments of this application, the word such as "example" or "for example" is used to indicate an example, an illustration, or a description. Any embodiment or design described as an "example" or "for example" in this application should not be construed as being more preferred or having more advantages than another embodiment or design. To be precise, the word such as "example" or "for example" is intended to present a related concept in a specific manner.

In embodiments of this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items" or a similar expression thereof indicates any combination of these items, including any combination of a singular item or a plurality of items. For example, at least one of a, b, or c may indicate a, b, c, a-b, a-c, b-c, or a-b-c, where a, b, and c may be singular or plural.

When a user uses a terminal device to run an application, and the application is run in a complex scene, freezing (also referred to as frame dropping) may occur on the terminal device. FIG. 1 is a diagram of a correspondence between a running time of an application and a frame rate that is of the application and that exists when a terminal device runs the application. In FIG. 1, a horizontal axis represents the running time of the application, and a vertical axis represents the frame rate that is of the application and that exists when the application is run. The frame rate of the application is set to 60 fps. In FIG. 1, at 4 minutes and 7 seconds into the running time of the application, the frame rate is only 31.34 fps, which is manifested on the terminal device. When the application is in a scene corresponding to 4 minutes and 7 seconds, freezing occurs on the terminal device. A complex scene may be a scene in which a quantity of draw calls is greater than a first preset threshold. The draw call is a command for a CPU to invoke an underlying graphics drawing interface. The draw call is used for the terminal device to perform tasks such as detecting a rendering status, submitting rendering data, and submitting the rendering status.

A reason is as follows: When the application is run in the complex scene, a shader consumes a relatively large proportion, which may be more than 90%, of workload of a computing unit in a GPU. When the shader consumes more than 90% of workload of a shader computing unit in the GPU, a rendering duration of one frame of image is too long. Consequently, the GPU cannot complete rendering within a time of one frame, which causes freezing to the application.

In addition, a factor that affects a rendering duration may further include a scene, a shader used in an application, and hardware information of a terminal device that runs the application. The scene may include a simple scene and a complex scene. The simple scene may be a scene in which a quantity of draw calls is less than or equal to the first preset threshold. The hardware information of the terminal device may include a type of a chip used in the terminal device or performance of a chip in the terminal device, for example, at least one of the following information: a central processing unit (CPU) frequency, a GPU frequency, or the like.

When the application is run on the terminal device, the hardware information of the terminal device is fixed, and it is not proper to change the scene. Therefore, the shader that is in the terminal device and that is used to render the scene is properly simplified to reduce load of a GPU. This ensures that the application of the terminal device can still be run smoothly in the complex scene.

On this basis, embodiments of this application provide a graphics rendering method. According to the method, when a terminal device runs an application, the terminal device can simplify a shader to a simplified shader. Because the simplified shader occupies relatively little workload of a computing unit in a GPU during running, freezing of the terminal device caused by occupancy of the GPU by the shader can be effectively alleviated.

That the terminal device simplifies a shader to a simplified shader may include two implementations.

Implementation 1: When the shader is run, the terminal device may simplify the shader in real time based on a specific rule, to obtain the simplified shader.

Implementation 2: Simplified shaders corresponding to shaders in different applications on terminal devices with different hardware information may be first learned, to obtain a plurality of target correspondences. The target correspondence includes a correspondence among information of the shader, information of the simplified shader, the hardware information of the terminal device, and a scene complexity of a scene. In this way, when the terminal device subsequently runs an application, the terminal device can obtain information of a simplified shader from the target correspondences based on a scene complexity of a scene of the application, information of a shader used in the application, and hardware information of the terminal device, and run the application by using the simplified shader. Because the simplified shader occupies relatively little workload of the computing unit in the GPU during running, freezing of the terminal device caused by occupancy of the GPU by the shader can be effectively alleviated.

Figure 2:
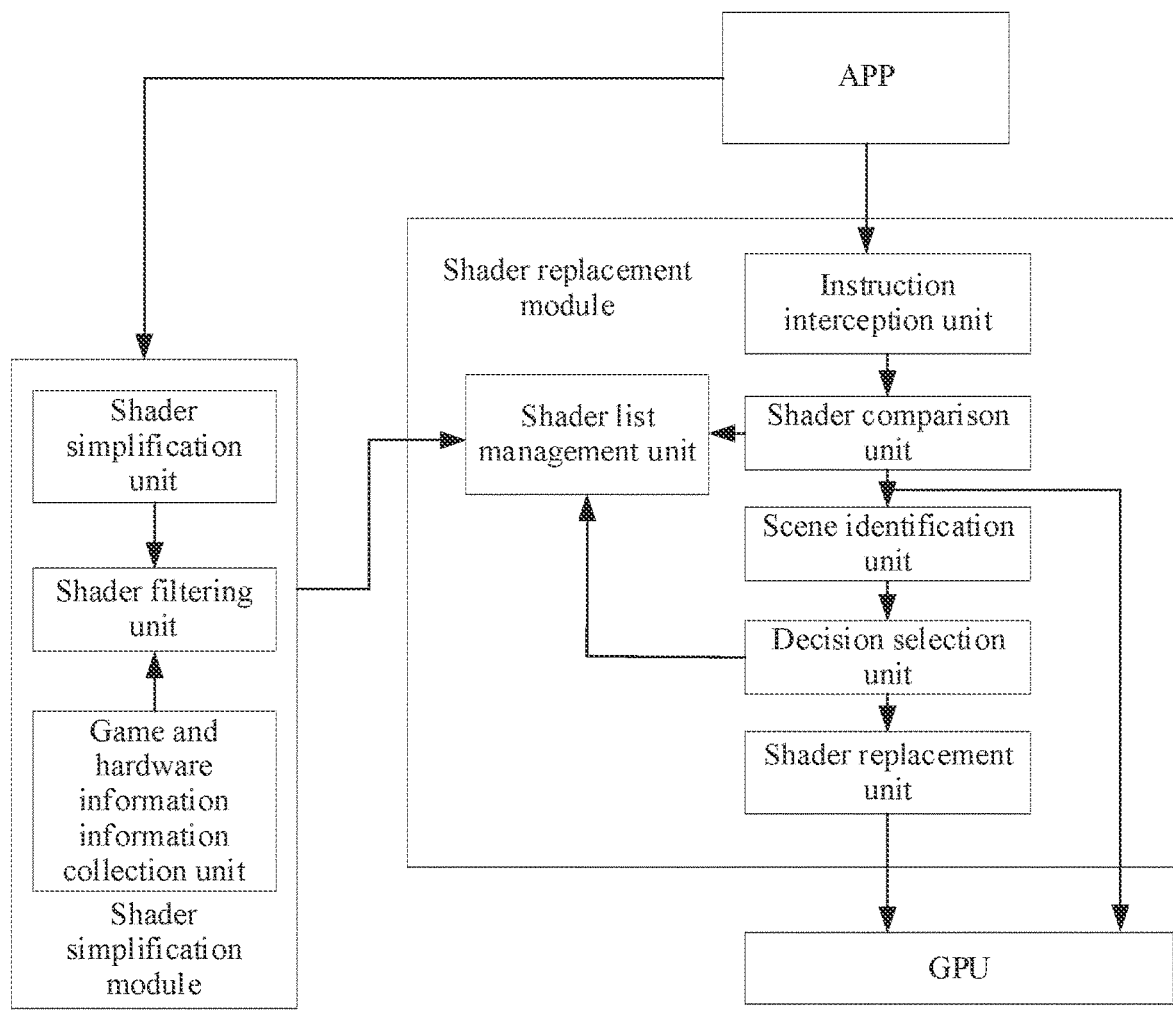
FIG. 2 is a schematic diagram of a structure of a simplification platform to which a graphics rendering method according to an embodiment of this application is applicable.

For example, for Implementation 2, the graphics rendering method provided in embodiments of this application is applicable to a simplification platform. The simplification platform may be configured to provide a uniform function of shader simplification for different applications and terminal devices with different hardware information. FIG. 2 is a schematic diagram of a structure of a simplification platform to which a graphics rendering method according to an embodiment of this application is applicable. The simplification platform may include a shader simplification module and a shader replacement module.

The shader simplification module is configured to obtain the foregoing plurality of target correspondences. The shader replacement module is configured to replace a shader with a simplified shader in a process in which a terminal device runs an application. It may be understood that the shader simplification module and the shader replacement module may be run on different devices, and may implement respective functions in different time periods. This is not limited in this embodiment of this application.

For example, as shown in FIG. 2, the shader simplification module may include a shader simplification unit, an application and hardware information collection unit, and a shader filtering unit.

The simplification subunit is configured to: collect a shader (for example, a vertex shader and/or a fragment shader) used in a process of running the application, simplify the collected shader based on a preset first preset rule to obtain a plurality of simplified shaders, and store the plurality of simplified shaders.

The application and hardware information collection unit is configured to: collect scene data (also referred to as status information) in the process of running the application (for example, the foregoing simplified application), and collect hardware information, for example, at least one of the following information: a CPU frequency and/or a GPU frequency of the terminal device.

The shader filtering unit is configured to filter the simplified shaders based on the collected scene data and hardware information, to obtain a plurality of target correspondences. For example, rendering times (also referred to as rendering durations) in the scene data are divided into groups in a descending order, and a simplified shader is selected from each group (which is also referred to as a simplification model), where an image quality of an image rendered by the simplified shader is greater than a second preset threshold. For another example, image qualities that are of rendered images and that are in the scene data are divided into segments, and a simplified shader is selected from each group, where a rendering duration of the simplified shader is less than a third preset threshold.

For example, the shader replacement module may include a shader list management unit, an application instruction interception unit, a shader comparison unit, a scene identification unit, a decision selection unit, and a shader replacement unit.

The shader list (namely, the foregoing plurality of target correspondences) management unit is configured to organize and store the foregoing plurality of obtained target correspondences based on a preset data structure. The preset data structure may be preset in code.

It may be understood that, all or some of functions of the shader list management unit may be integrated into the shader filtering unit, or all or some of the functions of the shader list management unit may be integrated into the decision selection unit. This is not limited in this embodiment of this application. For example, a function of obtaining a shader list based on a scene complexity, scene data, and hardware information may be integrated into the shader filtering unit.

The instruction interception unit is configured to intercept, in the application, an invoke instruction for the shader.

The shader comparison unit is configured to search a shader list for the shader for which the invoke instruction is intercepted. If the search fails (in other words, the shader for which the invoke instruction is intercepted is not in the shader list), the shader for which the invoke instruction is intercepted is not replaced, an original procedure of the application continues to be executed, and a GPU performs a next step, namely, rendering.

The scene identification unit is configured to: if shader comparison succeeds (in other words, the shader for which the invoke instruction is intercepted is in the shader list), identify a scene complexity, for example, a scene complexity that is of a scene and that corresponds to the shader that the shader for which the invoke instruction is intercepted.

The decision selection unit is configured to obtain information of a target simplified shader from the plurality of target correspondences based on a scene complexity of a scene of the application, information of the shader used in the application, and hardware information of the terminal device.

The shader replacement unit is configured to: replace the shader for which the invoke instruction is intercepted, compile a replacement shader, and send a compiled shader to the GPU for rendering.

An application (APP) in FIG. 2 is used to represent the application that is run on the terminal device.

Figure 3:
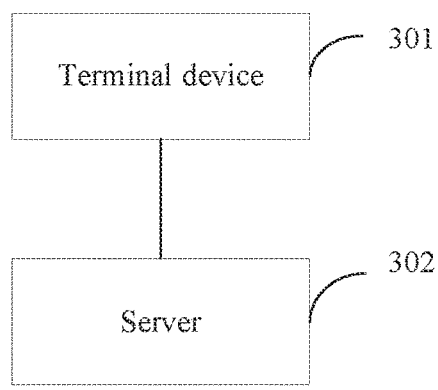
FIG. 3 is a schematic diagram of a structure of a graphics rendering system to which a graphics rendering method according to an embodiment of this application is applicable.

It may be understood that, functions of the simplified platform in this embodiment of this application may be implemented by a terminal device, or may be implemented by a graphics rendering system including a terminal device and a server. FIG. 3 is a schematic diagram of a structure of a graphics rendering system to which a graphics rendering method according to an embodiment of this application is applicable. A terminal device 301 and a server 302 are included in FIG. 3. The terminal device 301 may be a smartphone, a desktop computer, a notebook computer, a tablet computer, a virtual reality (VR) device, an augmented reality (AR) device, an intelligent wearable device, or the like. The server 302 may be a server, a server cluster, a cloud server, or the like. This is not limited in this embodiment of this application.

The terminal device 301 in FIG. 3 may be configured to implement a function or functions of one or more of the units in FIG. 2, and the server 302 implements a function of a remaining unit. For example, the terminal device 301 may be configured to implement a function of the shader replacement module in FIG. 2, and the server 302 may be configured to implement a function of the shader simplification module. Alternatively, the terminal device 301 may be configured to implement functions of the instruction interception unit, the scene identification unit, and the shader replacement unit, and the server 302 may be configured to implement functions of the shader simplification module, the shader list management unit, the shader comparison unit, the decision selection unit, and the like.

Figure 4:
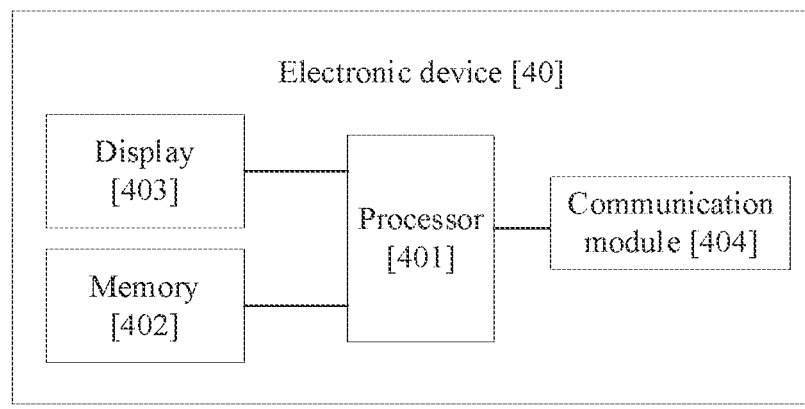
FIG. 4 is a schematic diagram of a structure of an electronic device to which a graphics rendering method according to an embodiment of this application is applicable.

A function of the terminal device 301 or the server 302 may be implemented by an electronic device shown in FIG. 4. FIG. 4 is a schematic diagram of a structure of an electronic device to which a graphics rendering method according to an embodiment of this application is applicable. An electronic device 40 shown in FIG. 4 may include a processor 401, a memory 402, a display 403, a communication module 404, and the like.

It may be understood that the structure shown in this embodiment does not constitute a specific limitation on the electronic device 40. In some other embodiments of this application, the electronic device 40 may include more or fewer components than those shown in the figure, or some components may be combined, or some components may be split, or a different component arrangement may be used. The components shown in the figure may be implemented by hardware, software, or a combination of software and hardware.

The processor 401 may include one or more processing units. For example, the processor 401 may include an application processor (AP), a modem processor, a GPU, an image signal processor (ISP), a controller, a video codec, a digital signal processor (DSP), a baseband processor, a display processing unit (DPU), a neural-network processing unit (NPU), and/or the like. Different processing units may be independent components, or may be integrated into one or more processors.

In some embodiments, the electronic device 40 may alternatively include one or more processors 401. The processor may be a nerve center and a command center of the electronic device 40. The processor may generate an operation control signal based on an instruction operation code and a timing signal, to implement control on instruction fetching and execution. The processor 401 may further be provided with a memory. The memory is configured to store instructions and data. In some embodiments, the memory in the processor 401 is a cache memory. The memory may store an instruction or data that has been used or is cyclically used by the processor 401. If the processor 401 needs to use the instruction or the data again, the processor 401 may directly invoke the instruction or the data from the memory. This avoids repeated access and reduces a waiting time of the processor 401, and therefore improves efficiency of the electronic device 40.

The communication module 404 in the electronic device 40 may use any apparatus such as a transceiver, and is configured to communicate with another device or a communication network, such as a wide area network (WAN) or a local area network (LAN).

The electronic device 40 may implement a display function by using a GPU, the display 403, an application processor, and the like. The application processor may include an NPU and a DPU. The GPU is a microprocessor for image processing, and is connected to the display 403 and the application processor. The GPU is configured to perform mathematical and geometric computations for graphics rendering. The processor 401 may include one or more GPUs. The one or more GPUs execute instructions to generate or change display information. The NPU is a neural-network (NN) computing processor, and simulates a biological neural network structure such as a mode of transmission between neurons in a human brain, to rapidly process input information. The NPU can further perform continuous self-learning. The NPU may implement applications such as intelligent cognition of the electronic device 40, for example, image recognition, facial recognition, speech recognition, and text understanding. The DPU is also referred to as a display sub-system (DSS). The DPU is configured to adjust a color of the display 403, and the DPU may adjust the color of the display 403 by using a three-dimensional lookup table (3D lookup table, 3D LUT). The DPU may further perform processing such as scaling, noise reduction, contrast enhancement, backlight brightness management, HDR processing, and display parameter Gamma adjustment on an image.

The display 403 is configured to display an image, a video, and the like. The display 403 includes a display panel. The display panel may be a liquid crystal display (LCD), an organic light-emitting diode (OLED), an active-matrix organic light-emitting diode or an active-matrix organic light-emitting diode (AMOLED), a flexible light-emitting diode (flex light-emitting diode, FLED), a mini-LED, a micro-LED, a micro-OLED, a quantum dot light-emitting diode (QLED), or the like. In some embodiments, the electronic device 40 may include one or N displays 403. N is a positive integer greater than 1.

The memory 402 may be configured to store one or more computer programs, and the one or more computer programs include instructions. The processor 401 may execute the instructions stored in the memory 402, to enable the electronic device 40 to perform various function applications, data processing and the like. The memory 402 may include a program storage area and a data storage area. The program storage area may store an operating system. The program storage area may further store one or more applications (for example, Gallery and Contacts), and the like. The data storage area may store data (for example, a photo and a contact) created during use of the electronic device 40, and the like. In addition, the memory 402 may include a high-speed random access memory, or may include a non-volatile memory, for example, at least one magnetic disk storage device, a flash memory, or a universal flash storage (UFS). In some embodiments, the processor 401 may execute the instructions stored in the memory 402 and/or instructions stored in a memory disposed in the processor 401, to enable the electronic device 40 to perform various function applications and data processing.

The memory 402 is configured to store a plurality of target correspondences in embodiments of this application.

The display 403 is configured to display an image, a video, and the like. The display 403 includes a display panel. The display panel may be a liquid crystal display (LCD), an organic light-emitting diode (OLED), an active-matrix organic light-emitting diode or an active-matrix organic light-emitting diode (AMOLED), a flexible light-emitting diode (flex light-emitting diode, FLED), a mini-LED, a micro-LED, a micro-OLED, a quantum dot light-emitting diode (QLED), or the like. In some embodiments, the electronic device 40 may include one or N displays 403. N is a positive integer greater than 1.

Figure 5:
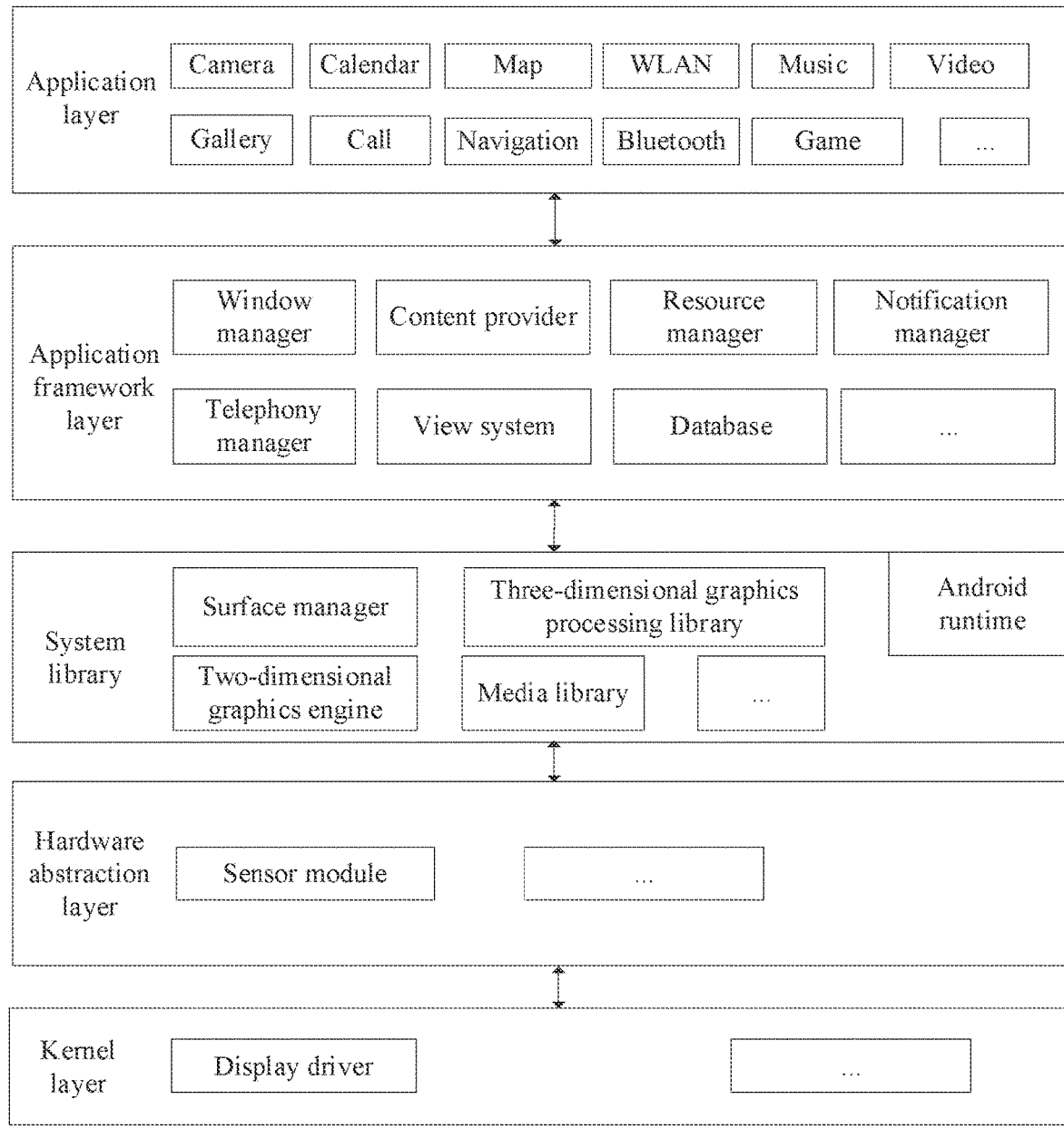
FIG. 5 is a block diagram of a software structure of an electronic device to which an embodiment of this application is applicable.

A software system of the electronic device 40 may use a layered architecture, an event-driven architecture, a micro-kernel architecture, a microservice architecture, or a cloud architecture. In an embodiment of this application, an Android system of a layered architecture is used as an example to describe a software structure of the electronic device 40. FIG. 5 is a block diagram of a software structure of an electronic device to which an embodiment of this application is applicable. In a layered architecture, the software system of the electronic device 40 is divided into several layers, and each layer has a clear role and task. The layers communicate with each other through a software interface. In some embodiments, the Android system may be divided into five layers: an application layer, an application framework layer, Android runtime and a system library, a hardware abstraction layer (HAL), and a kernel layer (kernel) from top to bottom.

The application layer may include a series of application packages. The application layer invokes an application programming interface (API) provided by the application framework layer, to run an application. As shown in FIG. 5, the application packages may include applications such as Camera, Gallery, Calendar, Phone, Map, Navigation, WLAN, Bluetooth, Music, Video, and Game.

The application framework layer provides an API and a programming framework for an application program at the application layer. The application framework layer includes some predefined functions. As shown in FIG. 5, the application framework layer may include a window manager, a content provider, a view system, a phone manager, a resource manager, a notification manager, a database, and the like.

The window manager is configured to manage a window program. The window manager may obtain a size of a display, determine whether there is a status bar, lock a screen, take a screenshot, and so on. The content provider may be configured to store and obtain data, and make the data accessible to an application. The data may include a video, an image, audio, calls that are made and received, a browsing history and a bookmark, a phone book, and the like. The view system includes visual controls such as a control for displaying text and a control for displaying a picture. The view system may be configured to construct an application. A display interface may include one or more views. For example, a display interface including a short message service message notification icon may include a view for displaying text and a view for displaying a picture. The phone manager is configured to provide a communication function of the electronic device 40, for example, management of a call status (including answering, declining, or the like). The resource manager provides various resources for an application, such as a localized character string, an icon, an image, a layout file, and a video file. The notification manager enables an application to display notification information in a status bar, and may be configured to convey a message of a notification type. The notification manager may automatically disappear after a short stay without a user interaction. For example, the notification manager is configured to notify download completion, provide a message notification, and the like. The notification manager may further provide a notification that appears in a top status bar of the system in a form of a chart or scroll bar text, such as a notification of an application running in the background, and may further provide a notification that appear on the screen in a form of a dialog window. For example, text information is prompted in the status bar, a prompt tone is made, the electronic device 40 vibrates, or an indicator light blinks. The database may be configured to organize, store, and manage data based on a data structure.

The Android runtime includes a core library and a virtual machine. The Android runtime is responsible for scheduling and management of the Android system. The core library may include two parts: a function that needs to be called by the Java language and a core library of Android. The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library (media libraries), a three-dimensional graphics processing library (for example, open graphics library, OpenGL), and a 2D graphics engine (for example, SGL).

The surface manager is configured to manage a display subsystem and provide fusion of 2D and 3D layers for a plurality of applications. The media library supports a plurality of common audio and video formats for playback and recording, as well as still image files. The media library may support a plurality of audio and video coding formats such as MPEG-4, H.264, MP3, AAC, AMR, JPG, and PNG. The three-dimensional graphics processing library is configured to implement three-dimensional graphics drawing, graphics rendering, composition, layer processing, and the like. The 2D graphics engine is a drawing engine for 2D drawing.

The hardware abstraction layer may include a plurality of library modules, and the library modules may include a sensor library module, and the like. The Android system may load a corresponding library module for device hardware, so that the application framework layer can access the device hardware. The device hardware may include a temperature sensor in the electronic device 40, and the like.

The kernel layer is a layer between hardware and software. The kernel layer is configured to drive the hardware, to enable the hardware to work. The kernel layer includes at least a display driver and the like. This is not limited in this embodiment of this application.

The graphics rendering method provided in embodiments of this application includes a learning procedure of a plurality of target correspondences and a procedure of simplifying, by using a plurality of target correspondences, a shader used in a process of running an application.

Figure 6:
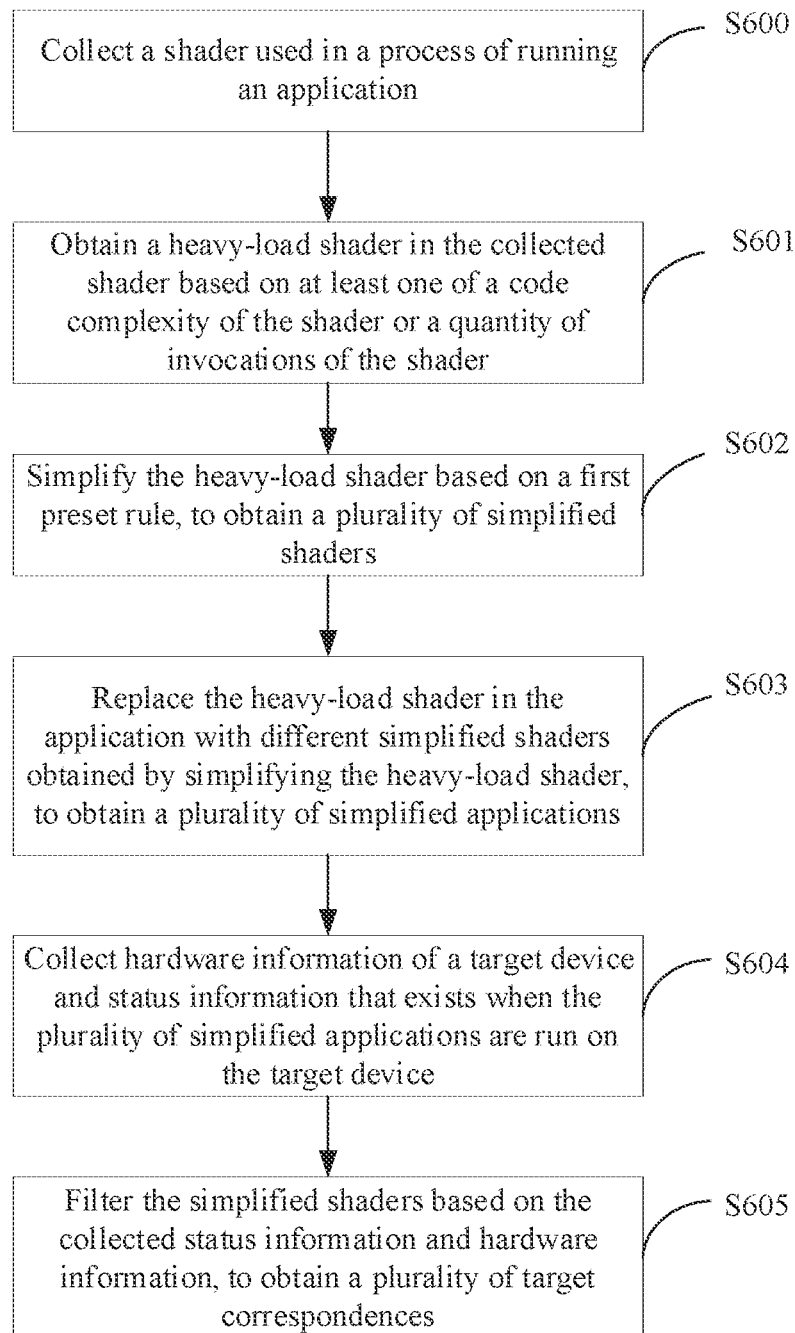
FIG. 6 is a schematic flowchart of a learning procedure of a plurality of target correspondences in a graphics rendering method according to an embodiment of this application.

FIG. 6 is a schematic flowchart of a learning procedure of a plurality of target correspondences in a graphics rendering method according to an embodiment of this application. As shown in FIG. 6, the learning procedure may include the following steps.

S600: A terminal device collects a shader used in a process of running an application.

In a possible implementation, the terminal device determines an invoke instruction for the shader based on a preset keyword, and intercepts the invoke instruction for the shader. The invoke instruction includes at least one of the shader or an identifier of the shader. When the invoke instruction does not include the shader, the terminal device obtains the shader based on the identifier of the shader. The preset keyword may be specified in code.

Figure 7:
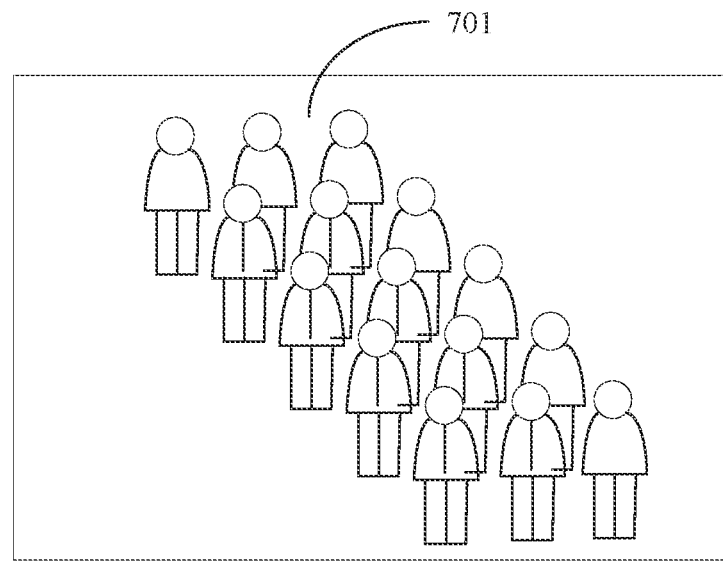
FIG. 7 is a schematic diagram of a scene that is of an application and to which an embodiment of this application is applicable.

For example, the preset keyword is ShaderSource. When the terminal device determines that the instruction includes ShaderSource, the terminal device obtains the invoke instruction for the shader. The invoke instruction that is for the shader and that is obtained by the terminal device is glShaderSource(vertexShader, 1, &vertexShaderSource, NULL). vertexShaderSource is the identifier of the shader. The terminal device obtains, based on vertexShaderSource, the shader indicated by the identifier. The shader indicated by vertexShaderSource is configured to render a color for a target object in a target scene shown in FIG. 7. The target object is soldiers 701 in the scene shown in FIG. 7, and the soldiers 701 are drawn by a visual control of a view system in the terminal device.

S601: The terminal device obtains a heavy-load shader in the collected shader based on at least one of a code complexity of the shader or a quantity of invocations of the shader.

The code complexity includes a time complexity, a space complexity, or the like. The time complexity indicates a trend in which a code execution time changes with an increase in a data size, and is also referred to as an asymptotic time complexity. The space complexity is referred to as an asymptotic space complexity, and indicates a trend in which a code execution time changes with an increase in a data size.

The quantity of invocations of the shader is a quantity of invocations of the shader in a scene rendered by the shader. A larger quantity of invocations of the shader indicates heavier load of the shader.

In a possible implementation, the terminal device determines, as the heavy-load shader, a shader whose code complexity is greater than a fourth preset threshold. Alternatively, the terminal device determines, as the heavy-load shader, a shader whose quantity of invocations is greater than a fifth preset threshold. Alternatively, the terminal device determines, as the heavy-load shader, a shader whose code complexity is greater than a fourth preset threshold and whose quantity of invocations is greater than a fifth preset threshold.

It may be understood that, a greater code complexity of the shader indicates a longer duration required for performing graphics rendering by using the shader. Therefore, the terminal device may obtain rendering durations of shaders, and use, as heavy-load shaders, a top preset proportion of the shaders sorted in order of rendering duration.

For example, the terminal device sorts the obtained rendering durations of the shaders in descending order, and uses, as heavy-load shaders, shaders corresponding to top 80% of the rendering durations.

S602: The terminal device simplifies the heavy-load shader based on a first preset rule, to obtain a plurality of simplified shaders, where the first preset rule includes at least one of code motion, expression deletion, or syntax simplification.

The code motion is moving a fragment in a fragment shader to a corresponding vertex shader and using a target execution result in the fragment shader. The target execution result is a result of the vertex shader executing the fragment.

A vertex shader and a fragment shader that render a same object correspond to each other.

For expression deletion, an expression is also referred to as a function in this embodiment of this application. All functions in the shader are used to generate a special effect or complete computation. Therefore, all the functions have specific impacts on a final rendering result, and the impacts range from large to small. The terminal device may obtain impact values of the functions, and delete a function whose impact value is less than a preset impact value. The preset impact value may be set in code.

Syntax simplification is simplifying code in the shader, to reduce a code amount. For example, an encapsulated packet is used to replace code that implements a same function.

In a possible implementation, the terminal device selects at least one variable or expression from a first shader as a moving target, extracts, as a target fragment, a statement that is in the first shader and that is related to computation of the moving target, and moves the target fragment to a second shader. The first shader is a fragment shader, and the second shader is a vertex shader corresponding to the first shader. The terminal device deletes the target fragment from the first shader, to obtain a simplified shader of the first shader. The simplified shader uses a result of the vertex shader executing the target fragment.

Figure 8A:
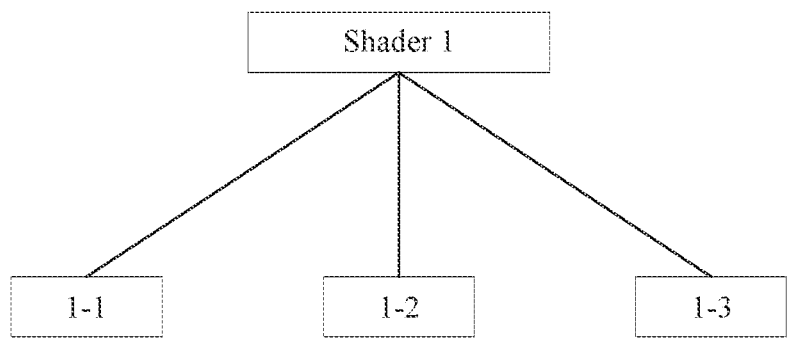
FIG. 8A is a schematic diagram of a shader and a simplified shader corresponding to the shader according to an embodiment of this application.

In an example, as shown in FIG. 8A, the terminal device performs code motion on a shader 1 to obtain a simplified shader 1, and an identifier of the simplified shader 1 is 1-1. The terminal device performs syntax simplification and expression deletion on the shader 1 to obtain a simplified shader 2, and an identifier of the simplified shader 2 is 1-2. The terminal device performs code motion, expression deletion, and syntax simplification on the shader 1 to obtain a simplified shader 3, and an identifier of the simplified shader 3 is 1-3.

Figure 8B:
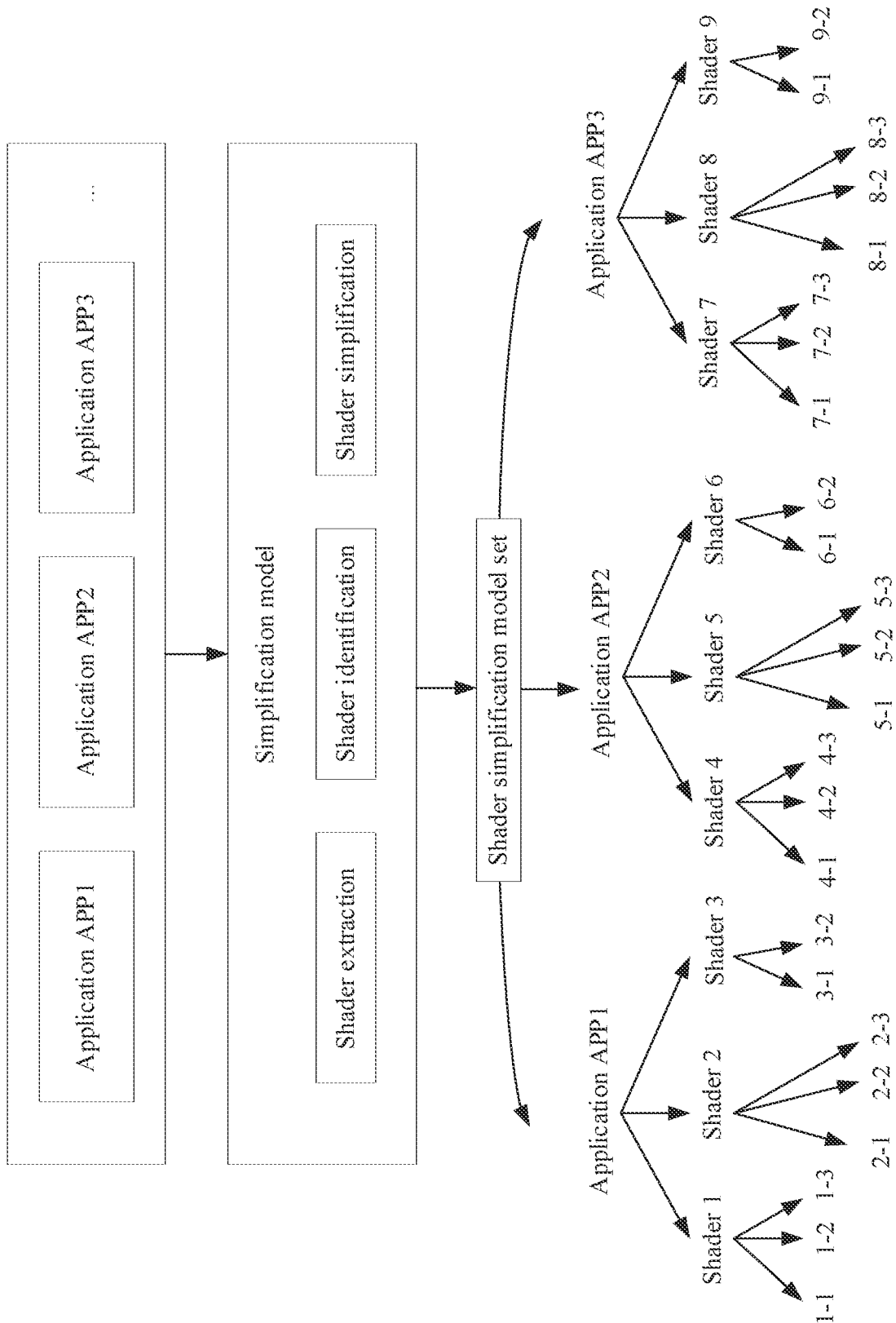
FIG. 8B is a schematic flowchart of another method for obtaining a simplified shader according to an embodiment of this application.

In another example, as shown in FIG. 8B, the terminal device extracts shaders from a plurality of applications (for example, applications APP1 to APP3 in FIG. 8B) based on a simplification model, and identifies heavy-load shaders in the extracted shaders. The terminal device simplifies the heavy-load shaders based on the first preset rule, to obtain a shader simplification model set. The simplification model is used to implement shader extraction, shader identification, and shader simplification.

For example, the simplification model extracts the shaders from the applications APP1 to APP3 in FIG. 8B. For a possible implementation, refer to the description of S600. Details are not described again. The simplification model performs shader identification on the extracted shaders, to determine that heavy-load shaders in the application APP1 include a shader 1, a shader 2, and a shader 3, heavy-load shaders in the application APP2 include a shader 4, a shader 5, and a shader 6, and heavy-load shaders in the application APP3 include a shader 7, a shader 8, and a shader 9. For a possible implementation, refer to the description of S601. Details are not described again. The simplification model simplifies the shader 1 based on different first preset rules, to obtain three simplified shaders whose identifiers are 1-1 to 1-3. The simplification model simplifies the shaders 2 to 9 in a similar manner, and details are not described again. For a possible implementation, refer to the description of S602. Details are not described again.

S603: The terminal device replaces the heavy-load shader in the application with different simplified shaders obtained by simplifying the heavy-load shader, to obtain a plurality of simplified applications, where the different simplified shaders are shaders obtained by simplifying the heavy-load shader based on different first preset rules.

In the example shown by FIG. 8B, the terminal device replaces the shader 1 in the application APP1 with the simplified shader whose identifier is 1-1, to obtain a first simplified application. The terminal device replaces the shader 1 in the application APP1 with the simplified shader whose identifier is 1-2, to obtain a second simplified application. The terminal device replaces the shader 1 in the application APP1 with the simplified shader whose identifier is 1-3, to obtain a third simplified application.

S604: The terminal device collects hardware information of a target device and status information that exists when the plurality of simplified applications are run on the target device, where the status information includes information such as a rendering duration required for the simplified shader, an image quality of a rendered image, load of the target device, power consumption of the target device, or a temperature of the target device, and the hardware information includes a type of a chip or performance of a chip, for example, at least one of the following information: a central processing unit (CPU) frequency, a GPU frequency, or the like.

S605: The terminal device filters the simplified shaders based on the collected status information and hardware information, to obtain a plurality of target correspondences, where the target correspondence includes a correspondence among information of a shader (namely, information of the heavy-load shader), target hardware information, a target load level, and information of a simplified shader, the target hardware information is the hardware information of the target device, and the target load level is a load level corresponding to the load that is of the target device and that exists when the simplified application is run on the target device.

In a possible implementation, the terminal device divides simplification models into groups in descending order of rendering duration, selects, from each group, a simplification model whose corresponding image quality is greater than a second preset threshold, and determines a plurality of first simplified shaders. The terminal device obtains the plurality of target correspondences based on the information of the heavy-load shader, information of the plurality of first simplified shaders, the hardware information of the terminal device, and a load level of the terminal device. The target image quality is greater than a second preset threshold, and the first simplified shader is a simplified shader in a simplified application corresponding to the target image quality. The load level of the terminal device may be obtained based on load of the terminal device in the status information.

For example, when the load of the terminal device is greater than a sixth preset threshold, the terminal device may qualify the load of the terminal device and determine that a load level corresponding to the load of the terminal device is a fixed value. The fixed value is a quantified value, for example, 1, corresponding to the load of the terminal device. A fixed value 1 represents high load, and a fixed value 0 represents low load.

In another possible implementation, the terminal device divides the image quality in the collected status information into segments based on hardware information of the terminal device and the collected status information, selects, from the segment, a target rendering duration corresponding to the segment, and determines second simplified shaders. The terminal device obtains the plurality of target correspondences based on the information of the heavy-load shader, information of the plurality of second simplified shaders, the hardware information of the terminal device, and a load level of the terminal device. The target rendering duration is less than a third preset threshold, and the second simplified shader is a simplified shader in a simplified application corresponding to the target rendering duration.

Shader files used by different applications are significantly different, and shader writing and generation manners of different application vendors are different. Therefore, when applications are run on the terminal device, it cannot be ensured that each application are run smoothly and stably. The terminal device uses many types of chips, and performance of GPUs on the chips are significantly different. When an application is run on different mobile phone chips, rendering durations for a same shader file corresponds are different. For each of different shaders in different applications, a simplified shader that corresponds to the shader when the shader corresponds to different hardware information and different load levels may be obtained by using the foregoing method, to adapt to different applications and terminal devices with different hardware information.

It may be understood that the foregoing two possible implementations may be combined to obtain two different types of target correspondences, and the terminal device separately stores the two different types of target correspondences. The terminal device may put, in response to a configuration instruction, a specific type of target correspondences into effect. For example, the configuration instruction may be an operation instruction of a user received by the terminal device.

Figure 9:
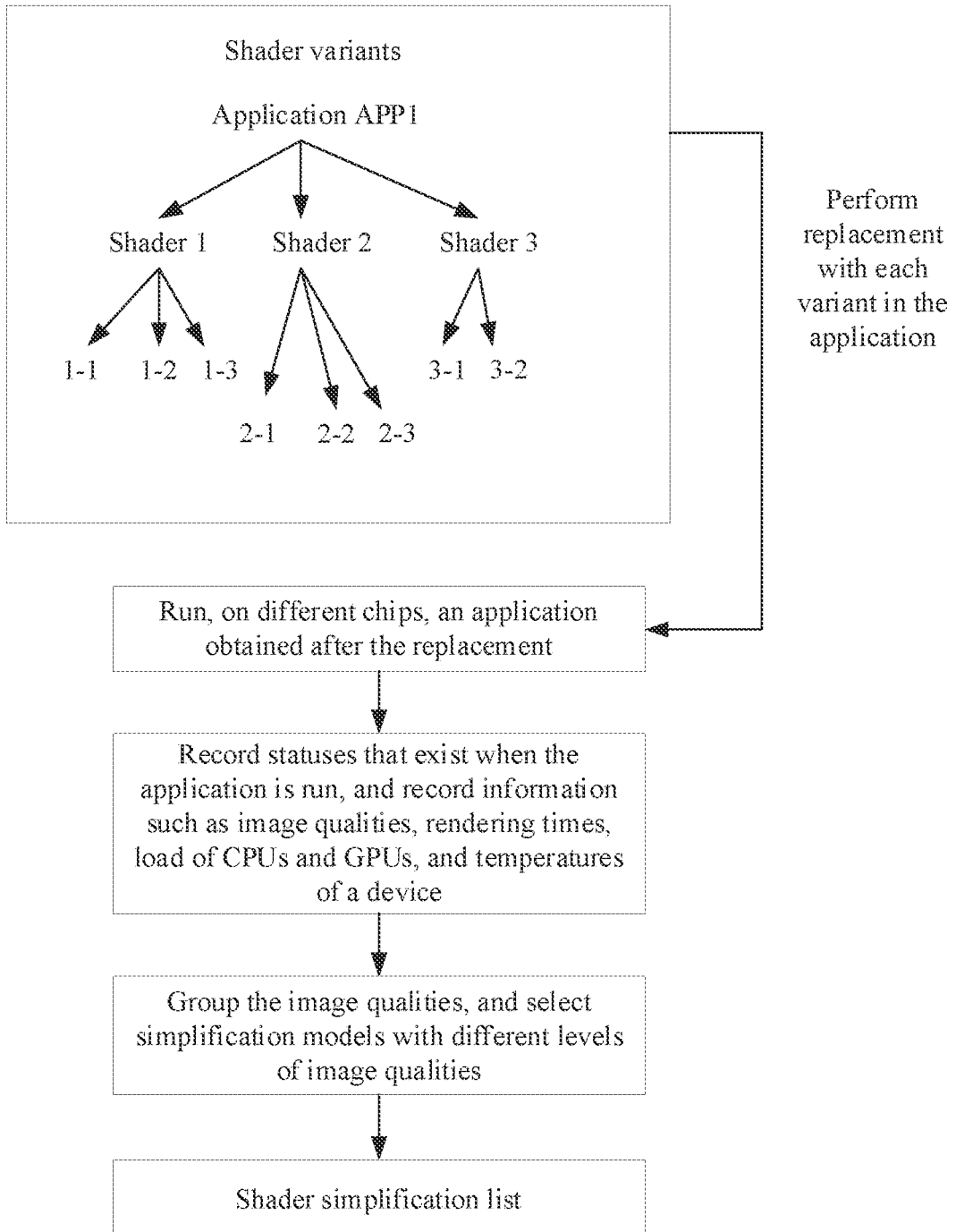
FIG. 9 is a schematic flowchart that describes, from another perspective, a learning procedure of a plurality of target correspondences according to an embodiment of this application.

FIG. 9 is a schematic flowchart that describes, from another perspective, a learning procedure of a plurality of target correspondences according to an embodiment of this application. In FIG. 9, a heavy-load shader in an application APP1 includes a shader 1, a shader 2, and a shader 3. Shader variants of the shader 1 include shaders numbered 1-1 to 1-3, shader variants of the shader 2 include shaders numbered 2-1 to 2-3, and shader variants of the shader 3 include shaders numbered 3-1 and 3-2.

A terminal device performs replacement with each variant (shader variant) in an application. For example, the terminal device replaces the shader 1 in the application with the shader variants of the shader 1. As a result, a plurality of applications are obtained after the replacement. This step corresponds to the description of S603 in the foregoing embodiment, and details are not described again. The application obtained after the replacement is run on devices with different hardware information (for example, different chips). The terminal device records: status information, namely, an image quality of a rendered image, a rendering duration, load of a CPU and a GPU, and a temperature of the device, that exists when the application is run. This step corresponds to the description of S604 in the foregoing embodiment, and details are not described again. The terminal device groups the image qualities of the rendered images, and selects simplification models with different image qualities, to obtain a shader simplification list. This step corresponds to the description of S901 in the foregoing embodiment, and details are not described again.

Figure 10:
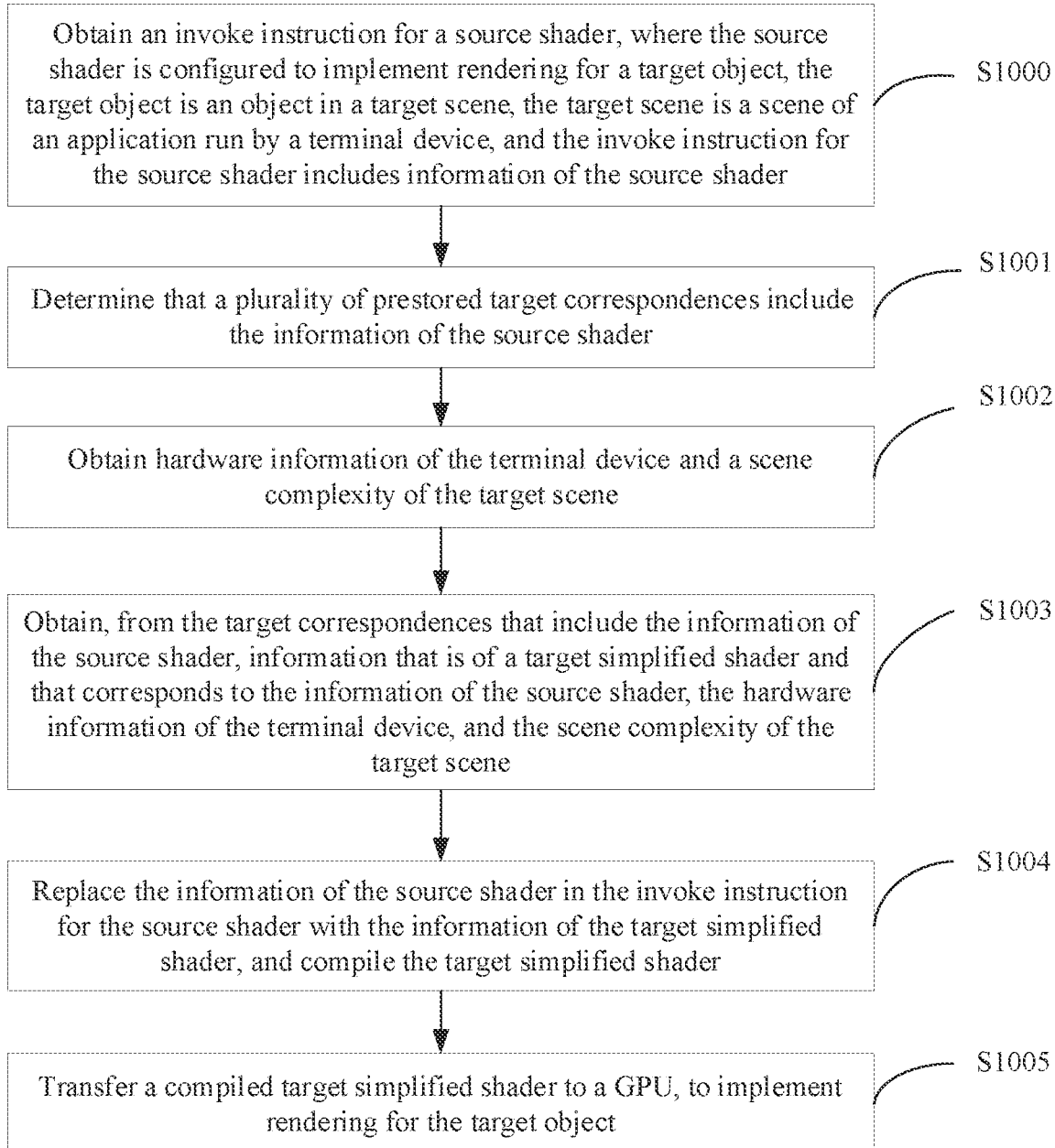
FIG. 10 is a schematic flowchart of simplifying, by using a plurality of target correspondences, a shader used in a process of running an application in a graphics rendering method according to an embodiment of this application.

FIG. 10 is a schematic flowchart of simplifying, by using a plurality of target correspondences, a shader used in a process of running an application in a graphics rendering method according to an embodiment of this application. FIG. 10 may include the following steps.

S1000: A terminal device obtains an invoke instruction for a source shader, where the source shader is configured to implement rendering for a target object, the target object is an object in a target scene, the target scene is a scene of an application run by the terminal device, the invoke instruction for the source shader includes information of the source shader, and the information of the source shader may include at least one of the source shader or an identifier of the source shader.

In a possible implementation, the terminal device determines an invoke instruction for the source shader based on a preset keyword, and intercepts the invoke instruction for the source shader. The preset keyword may be specified in code.

For example, the preset keyword is ShaderSource. When the terminal device determines that the instruction includes ShaderSource, the terminal device obtains the invoke instruction for the source shader. The information, of the source shader, included in the invoke instruction that is for the source shader and that is obtained by the terminal device is SShader. A shader represented by SShader is configured to render a color for a target object in a target scene shown in FIG. 7. The target object is soldiers 701 in the scene shown in FIG. 7, and the soldiers 701 are drawn by a visual control of a view system in the terminal device.

S1001: The terminal device determines that a plurality of prestored target correspondences include the information of the source shader.

In this embodiment of this application, the plurality of target correspondences are the plurality of obtained target correspondences in the foregoing embodiments, and details are not described again.

In a possible implementation, the terminal device traverses information that is of shaders and that is in the plurality of prestored target correspondences, and determines that the plurality of target correspondences include the information of the source shader.

In the example of S1000, the terminal device determines that the plurality of target correspondences include SShader.

In another possible implementation, the terminal device traverses information that is of shaders and that is in a specific type of target correspondences, and determines that the specific type of target correspondences include the information of the source shader. The specific type of target correspondences are target correspondences put into effect by the terminal device according to a configuration instruction.

S1002: The terminal device obtains hardware information of the terminal device and a scene complexity of the target scene.

In a possible implementation, the terminal device obtains the hardware information of the terminal device, and computes a quantity of draw calls in the target scene. The terminal device determines the scene complexity of the target scene based on the quantity of draw calls. The draw call is a command for a CPU to invoke an underlying graphics drawing interface. The draw call is used for the terminal device to perform tasks such as detecting a rendering status, submitting rendering data, and submitting the rendering status.

For example, the hardware information obtained by the terminal device includes a CPU frequency of 3.0 GHz and a GPU frequency of 850 MHz. If the quantity of draw calls in the target scene that is computed by the terminal device is 600, and a first preset threshold is 300, the quantity of draw calls that is computed by the terminal device is greater than the first preset threshold. In this case, the terminal device determines the scene complexity of the target scene as a fixed value, for example, 1. 1 represents a high scene complexity.

It should be noted that the scene complexity and the load level in the foregoing embodiment correspond to each other. If the hardware information of the terminal device is the same, a higher scene complexity indicates higher load that is of the terminal device and that exists when the terminal device runs in the scene.

S1003: The terminal device obtains, from the target correspondences that include the information of the source shader, information that is of a target simplified shader and that corresponds to the information of the source shader, the hardware information of the terminal device, and the scene complexity of the target scene.

In this embodiment of this application, the target correspondences that include the information of the source shader are the target correspondences that include the information of the source shader and that are determined in S1001.

In a possible implementation, the terminal device obtains, from the target correspondences that include the information of the source shader, the information that is of the target simplified shader and that corresponds to the information of the source shader, the hardware information of the terminal device, and the scene complexity of the target scene.

For example, the plurality of target correspondences are shown in Table 1.

TABLE 1

| Information of a shader | GPU frequency | CPU main frequency | Scene complexity | Information of a simplified shader |
| --- | --- | --- | --- | --- |
| SShader | 850 MHz | 3.0 GHz | 1 | Shader 1 |
| SShader | 2330 MHZ | 3.6 GHz | 1 | Shader 2 |
| VShader | 1000 MHz | 3.8 GHz | 0 | Shader 3 |

In Table 1, when the information of the shader is SShader, the GPU frequency in the hardware information is 850 MHz, the CPU frequency in the hardware information is 3.0 GHz, and the scene complexity is 1, the corresponding information of the simplified shader is the shader 1. When the information of the shader is SShader, the GPU frequency in the hardware information is 2330 MHz, the CPU frequency in the hardware information is 3.6 GHz, and the scene complexity is 1, the corresponding information of the simplified shader is the shader 2. When the information of the shader is VShader, the GPU frequency in the hardware information is 1000 MHz, the CPU frequency in the hardware information is 3.8 GHz, and the scene complexity is 0, the corresponding information of the simplified shader is the shader 3. A scene complexity represented by 0 is lower than a scene complexity represented by 1.

In the examples of S1001 and S1002, the terminal device gets, from the plurality of target correspondences shown in Table 1, that when the information of the shader is SShader, the GPU frequency is 850 MHz, the CPU frequency is 3.0 GHz, and the scene complexity of the target scene is 1, the corresponding information of the target simplified shader is the shader 1.

It may be understood that, the terminal device may alternatively obtain, from the target correspondences that include the information of the source shader, information that is of a target simplified shader and that corresponds to the information of the source shader and the hardware information of the terminal device.

S1004: The terminal device replaces the information of the source shader in the invoke instruction for the source shader with the information of the target simplified shader, and compiles the target simplified shader.

When the information of the source shader is the source shader, the terminal device replaces the source shader with the target simplified shader, and converts the target simplified shader into a shader that is in binary language and that can be identified by the terminal device. Both the source shader and the target simplified shader are shaders written in shader language. For example, both the source shader and the target simplified shader are shaders written in OpenGL shading language.

When the information of the source shader is the identifier of the source shader, the terminal device replaces, with the target simplified shader, the source shader indicated by the identifier of the source shader, and converts the target simplified shader into a shader that is in binary language and that can be identified by the terminal device.

S1005: The terminal device transfers a compiled target simplified shader to a GPU, to implement rendering for the target object.

In a possible implementation, the terminal device transfers the compiled target simplified shader to the GPU, and the GPU runs the target simplified shader to implement rendering for the target object.

In the example of S1000, the target object is a group of soldiers. The GPU runs the target simplified shader to render a same color for armor worn by the group of soldiers.

In this embodiment of this application, the terminal device learns simplified shaders corresponding to shaders in different applications on terminal devices with different hardware information, to obtain a plurality of target correspondences. In this way, when the terminal device runs the application, the terminal device can obtain information of a target simplified shader from the target correspondences based on a scene complexity of a scene of the application, information of a shader used in the application, and hardware information of the terminal device, and run the application by using the simplified shader. Because the simplified shader occupies relatively little workload of the computing unit in the GPU during running, freezing of the terminal device caused by occupancy of the GPU by the shader can be effectively alleviated.

Figure 11:
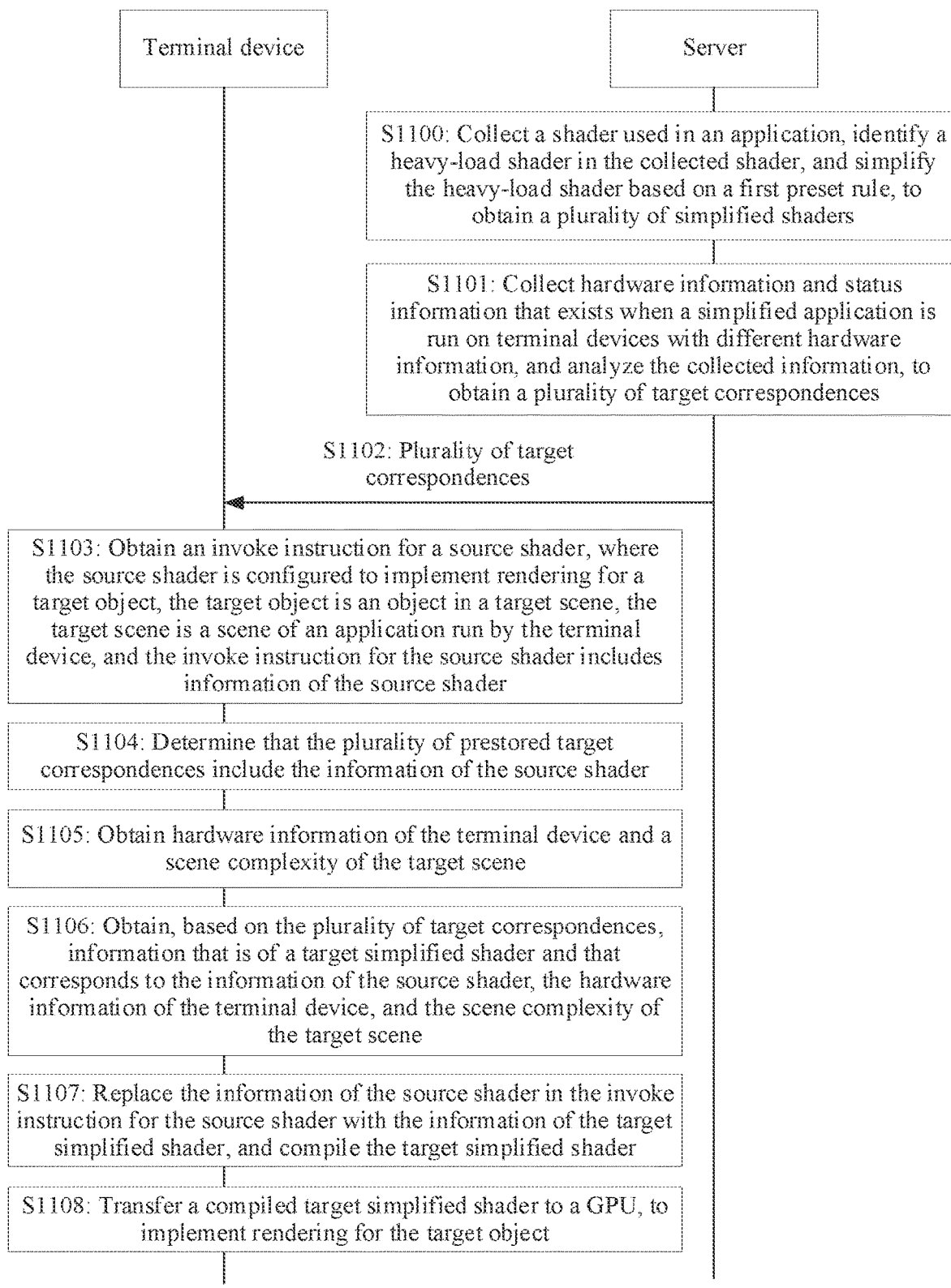
FIG. 11 is a schematic flowchart of another graphics rendering method according to an embodiment of this application.

It may be understood that the steps in the foregoing embodiment may be performed by different devices, to obtain a new embodiment. For example, FIG. 11 is a schematic flowchart of another graphics rendering method according to an embodiment of this application. The another graphics rendering method is applied to the graphics rendering system shown in FIG. 3. FIG. 11 includes the following steps.

S1100: A server collects a shader used in an application, identifies a heavy-load shader in the collected shader, and simplifies the heavy-load shader based on a first preset rule, to obtain a plurality of simplified shaders.

For a possible implementation, refer to the descriptions of S600 to S602. Details are not described again.

S1101: The server collects hardware information and status information that exists when a simplified application is run on terminal devices with different hardware information, and analyzes the collected information, to obtain a plurality of target correspondences, where the simplified application is an application obtained by replacing the shader in the application with the simplified shader, and the target correspondence is a target correspondence among information of the shader, the hardware information, a scene complexity, and information of the simplified shader.

For a possible implementation, refer to the descriptions of S603 to S605. Details are not described again.

S1102: The server sends the plurality of target correspondences to a terminal device.

S1103: The terminal device obtains an invoke instruction for a source shader, where the source shader is configured to implement rendering for a target object, the target object is an object in a target scene, the target scene is a scene of an application run by the terminal device, the invoke instruction for the source shader includes information of the source shader, and the information of the source shader may include at least one of the source shader or an identifier of the source shader.

For a possible implementation and an example, refer to the description of S1000. Details are not described again.

S1104: The terminal device determines that the plurality of prestored target correspondences include the information of the source shader.

For a possible implementation and an example, refer to the description of S1001. Details are not described again.

S1105: The terminal device obtains hardware information of the terminal device and a scene complexity of the target scene.

For a possible implementation and an example, refer to the description of S1002. Details are not described again.

S1106: The terminal device obtains, based on the plurality of target correspondences, information that is of a target simplified shader and that corresponds to the information of the source shader, the hardware information of the terminal device, and the scene complexity of the target scene.

For a possible implementation and an example, refer to the description of S1003. Details are not described again.

For S1107 and S1108, refer to the descriptions of S1004 and S1005. Details are not described again.

In this embodiment of this application, the server learns simplified shaders corresponding to shaders in different applications on terminal devices with different hardware information, to obtain a plurality of target correspondences. The server sends the plurality of obtained target correspondences to a terminal device. In this way, when the terminal device runs an application, the terminal device can obtain information of a target simplified shader from the plurality of target correspondences based on a scene complexity of a scene of the application, information of a shader used in the application, and hardware information of the terminal device, and run the application by using the simplified shader. Because the simplified shader occupies relatively little workload of a computing unit in the GPU during running, freezing of the terminal device caused by occupancy of the GPU by the shader can be effectively alleviated.

Figure 12:
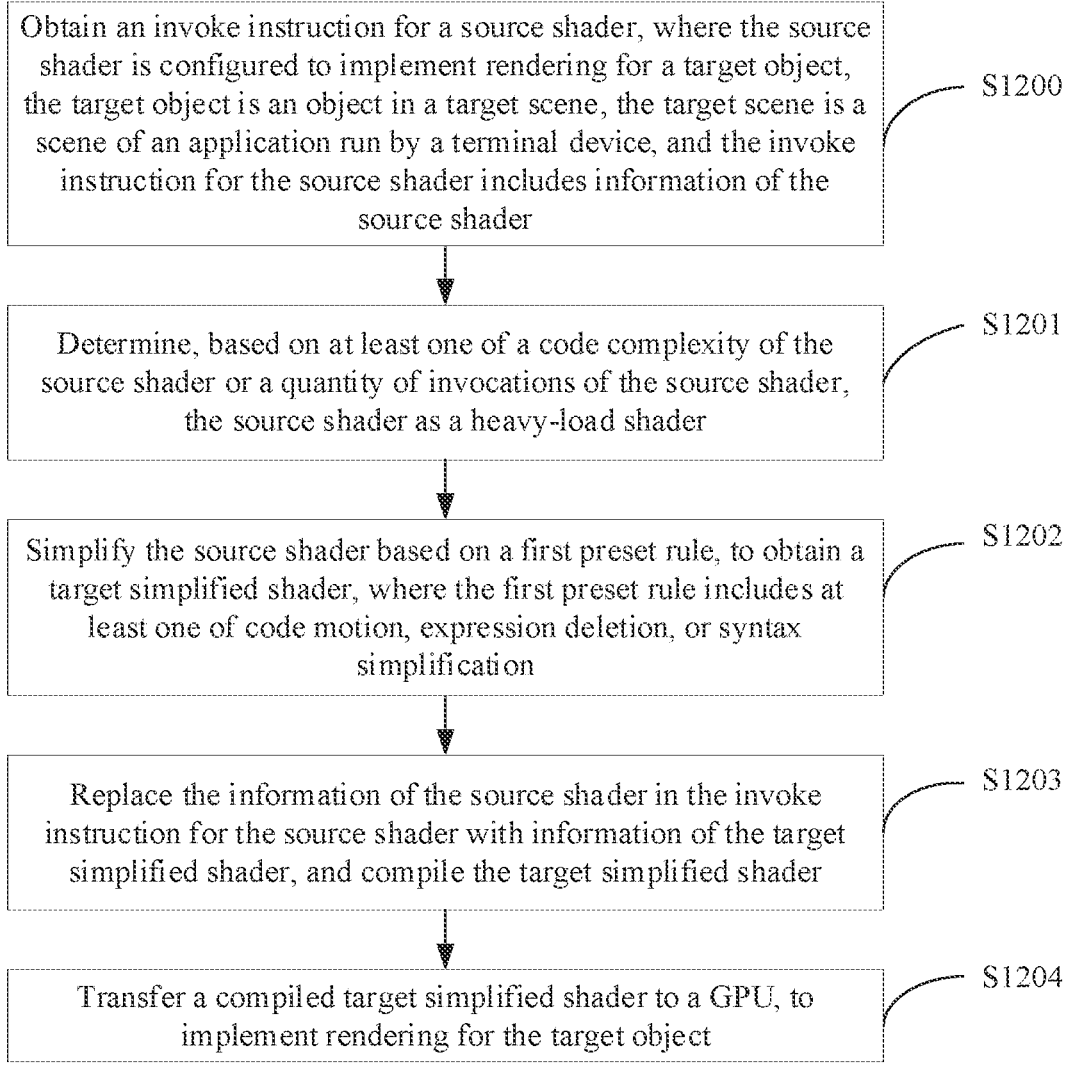
FIG. 12 is a schematic flowchart of another graphics rendering method according to an embodiment of this application.

FIG. 12 is a schematic flowchart of another graphics rendering method according to an embodiment of this application. FIG. 12 includes the following steps.

S1200: A terminal device obtains an invoke instruction for a source shader, where the source shader is configured to implement rendering for a target object, the target object is an object in a target scene, the target scene is a scene of an application run by the terminal device, the invoke instruction for the source shader includes information of the source shader, and the information of the source shader may include at least one of the source shader or an identifier of the source shader.

For a possible implementation and an example, refer to the description of S1000. Details are not described again.

S1201: The terminal device determines, based on at least one of a code complexity of the source shader or a quantity of invocations of the source shader, the source shader as a heavy-load shader.

For a possible implementation and an example, refer to the description of S601. Details are not described again.

S1202: The terminal device simplifies the source shader based on a first preset rule, to obtain a target simplified shader, where the first preset rule includes at least one of code motion, expression deletion, or syntax simplification.

For a possible implementation and an example, refer to the description of S602. Details are not described again.

S1203: The terminal device replaces the information of the source shader in the invoke instruction for the source shader with information of the target simplified shader, and compiles the target simplified shader.

For a possible implementation and an example, refer to the description of S1004. Details are not described again.

S1204: The terminal device transfers a compiled target simplified shader to a GPU, to implement rendering for the target object.

For a possible implementation and an example, refer to the description of S1005. Details are not described again.

In this embodiment of this application, when the terminal device runs an application, the terminal device can simplify a heavy-load shader in the application in real time, and run the application by using a simplified shader. Because the simplified shader occupies relatively little workload of a computing unit in the GPU during running, freezing of the terminal device caused by occupancy of the GPU by the shader can be effectively alleviated.

The foregoing mainly describes the solutions provided in embodiments of this application from a perspective of the method. To implement the foregoing functions, corresponding hardware structures and/or software modules for performing the functions are included. A person skilled in the art should be easily aware that the method steps in the examples described with reference to the embodiments disclosed in this specification can be implemented in this application in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, an apparatus for implementing an ambient illumination intensity determining method may be divided into functional modules based on the foregoing method examples. For example, each functional module may be obtained through division based on each corresponding function, or two or more functions may be integrated into one processing module. For example, functions of a target application, a drawing interface, and a display engine are integrated into a display control unit. The integrated module may be implemented in a form of hardware, or may be implemented in a form of a software function module. It should be noted that, in embodiments of this application, division into the modules is an example and is merely logical function division. During actual implementation, there may be another division manner.

Figure 13:
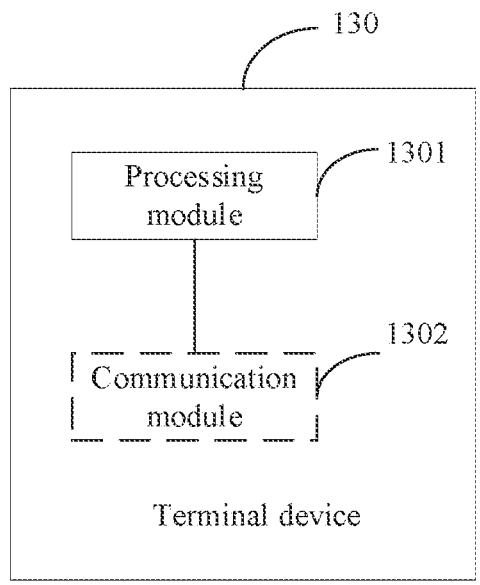
FIG. 13 is a schematic diagram of a structure of a terminal device according to an embodiment of this application.

FIG. 13 is a schematic diagram of a structure of a terminal device according to an embodiment of this application. As shown in FIG. 13, a terminal device 130 includes a processing module 1301. The processing module 1301 is configured to: perform graphics rendering for an application by using a target shader; obtain a target simplified shader when it is determined that the application is run in a complex scene, where the complex scene is a scene in which a quantity of instructions for running the application is greater than a first preset threshold, and computing resources of the terminal device 130 that are occupied by the target simplified shader are fewer than computing resources of the terminal device 130 that are occupied by the target shader; and perform graphics rendering for the application in the complex scene by using the target simplified shader. For example, with reference to FIG. 6, the processing module 1301 may be configured to perform S600 to S605; with reference to FIG. 10, the processing module 1301 may be configured to perform S1000 to S1005; with reference to FIG. 11, the processing module 1301 may be configured to perform S1103 to S1108; and with reference to FIG. 12, the processing module 1301 may be configured to perform S1200 to S1204.

Optionally, the processing module 1301 is specifically configured to obtain the target simplified shader based on a plurality of prestored correspondences, where the plurality of correspondences include a correspondence among information of a shader, hardware information of a device, and a simplified shader, and the information of the shader includes any one of the shader or an identifier of the shader.

Optionally, the processing module 1301 is specifically configured to obtain, from the plurality of correspondences, the target simplified shader corresponding to information of the target shader and hardware information of the terminal device 130.

Optionally, the correspondence further includes a load level, the load level is a quantified value corresponding to load of the terminal device 130, and the processing module 1301 is specifically configured to: obtain a quantity of draw calls in the complex scene; obtain a target load level based on the quantity of draw calls; and obtain, from the plurality of correspondences, the target simplified shader corresponding to information of the target shader, the target load level, and hardware information of the terminal device 130.

Optionally, the processing module 1301 is further configured to: simplify the target shader based on a first preset rule, to obtain a plurality of simplified shaders, where the first preset rule includes at least one of code motion, expression deletion, or syntax simplification, and the plurality of simplified shaders include the target simplified shader; collect status information that is of the terminal device 130 and that exists when the terminal device 130 performs graphics rendering for the application in the complex scene by using the plurality of simplified shaders, where the status information of the terminal device 130 includes load of the terminal device 130, power consumption of the terminal device 130, a temperature of the terminal device 130, a rendering duration, and an image quality of an image rendered by each simplified shader, and the rendering duration is a duration required for performing graphics rendering for the application in the complex scene by using each simplified shader; and obtain a correspondence among the information of the target shader, the hardware information of the terminal device 130, a target load level, and the target simplified shader based on the status information.

Optionally, the processing module 1301 is specifically configured to: obtain a plurality of target rendering durations from the status information, where the plurality of target rendering durations each are less than a second preset threshold; obtain target status information from the status information corresponding to the plurality of target rendering durations, where an image quality in the target status information is greater than a third preset threshold, and the target status information is status information that is of the terminal device 130 and that exists when graphics rendering is performed for the application in the complex scene by using the target simplified shader; obtain the target load level based on load of the terminal device 130 in the target status information; and establish the correspondence among the information of the target shader, the hardware information of the terminal device 130, the target load level, and the target simplified shader.

Optionally, the processing module 1301 is specifically configured to: obtain a plurality of target image qualities from the status information, where the plurality of target image qualities each are greater than a fourth preset threshold; obtain target status information from the status information corresponding to the plurality of target image qualities, where a rendering duration in the target status information is less than a fifth preset threshold, and the target status information is status information that is of the terminal device 130 and that exists when graphics rendering is performed for the application in the complex scene by using the target simplified shader; obtain the target load level based on load of the terminal device 130 in the target status information; and establish the correspondence among the information of the target shader, the hardware information of the terminal device 130, the target load level, and the target simplified shader.

Optionally, the terminal device 130 further includes a communication module 1302, configured to receive the plurality of correspondences sent by another device. For example, with reference to FIG. 11, the communication module 1302 may be configured to perform the receiving step in S1102.

Optionally, the processing module 1301 is specifically configured to simplify the target shader based on a first preset rule, to obtain the target simplified shader, where the first preset rule includes at least one of code motion, expression deletion, or syntax simplification.

Optionally, when the terminal device 130 determines that the application is run in the complex scene, the processing module 1301 is specifically configured to obtain the target simplified shader when it is determined that the application is run in the complex scene, and a code complexity of the target shader is greater than a sixth preset threshold, or a quantity of invocations of the target shader is greater than a seventh preset threshold. In an example, with reference to FIG. 4, a function of the processing module 1301 may be implemented by invoking a computer program in the memory 402 by the processor 401 in FIG. 4. A function of the communication module 1302 may be implemented by the communication module 404 in FIG. 4.

Figure 14:
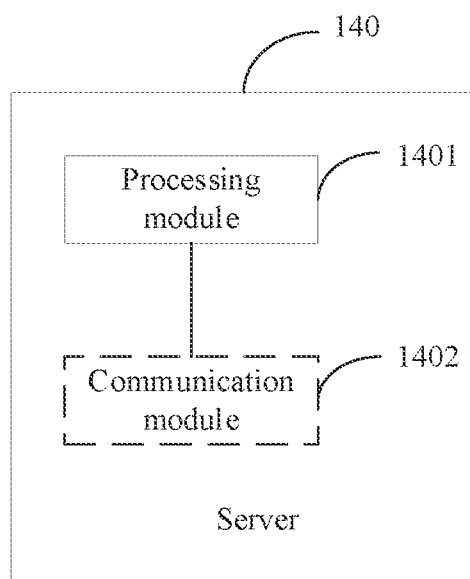
FIG. 14 is a schematic diagram of a structure of a server according to an embodiment of this application.

FIG. 14 is a schematic diagram of a structure of a server according to an embodiment of this application. As shown in FIG. 14, a server 140 includes a processing module 1401. The processing module 1401 is configured to: simplify a target shader based on a first preset rule, to obtain a plurality of simplified shaders, where the first preset rule includes at least one of code motion, expression deletion, or syntax simplification, and the plurality of simplified shaders include a target simplified shader; collect status information that is of a terminal device and that exists when the terminal device performs graphics rendering for an application in a complex scene by using the plurality of simplified shaders, where the status information of the terminal device includes load of the terminal device, power consumption of the terminal device, a temperature of the terminal device, a rendering duration, and an image quality of an image rendered by each simplified shader, and the rendering duration is a duration required for performing graphics rendering for the application in the complex scene by using each simplified shader; and obtain a correspondence among information of the target shader, hardware information of the terminal device, a target load level, and the target simplified shader based on the status information. For example, with reference to FIG. 11, the processing module 1401 may be configured to perform S1100 and S1101.

Optionally, the processing module 1401 is specifically configured to: obtain a plurality of target rendering durations from the status information, where the plurality of target rendering durations each are less than a second preset threshold; obtain target status information from the status information corresponding to the plurality of target rendering durations, where an image quality in the target status information is greater than a third preset threshold, and the target status information is status information that is of the terminal device and that exists when graphics rendering is performed for the application in the complex scene by using the target simplified shader; obtain the target load level based on load of the terminal device in the target status information; and establish the correspondence among the information of the target shader, the hardware information of the terminal device, the target load level, and the target simplified shader.

Optionally, the processing module 1401 is specifically configured to: obtain a plurality of target image qualities from the status information, where the plurality of target image qualities each are greater than a fourth preset threshold; obtain target status information from the status information corresponding to the plurality of target image qualities, where a rendering duration in the target status information is less than a fifth preset threshold, and the target status information is status information that is of the terminal device and that exists when graphics rendering is performed for the application in the complex scene by using the target simplified shader; obtain the target load level based on load of the terminal device in the target status information; and establish the correspondence among the information of the target shader, the hardware information of the terminal device, the target load level, and the target simplified shader.

Optionally, the server 140 further includes a communication module 1402, configured to send a plurality of correspondences to the terminal device. For example, with reference to FIG. 11, the communication module 1402 may be configured to perform the sending step in S1102.

In an example, with reference to FIG. 4, a function of the processing module 1401 may be implemented by invoking a computer program in the memory 402 by the processor 401 in FIG. 4. A function of the communication module 1402 may be implemented by the communication module 404 in FIG. 4.

Figure 15:
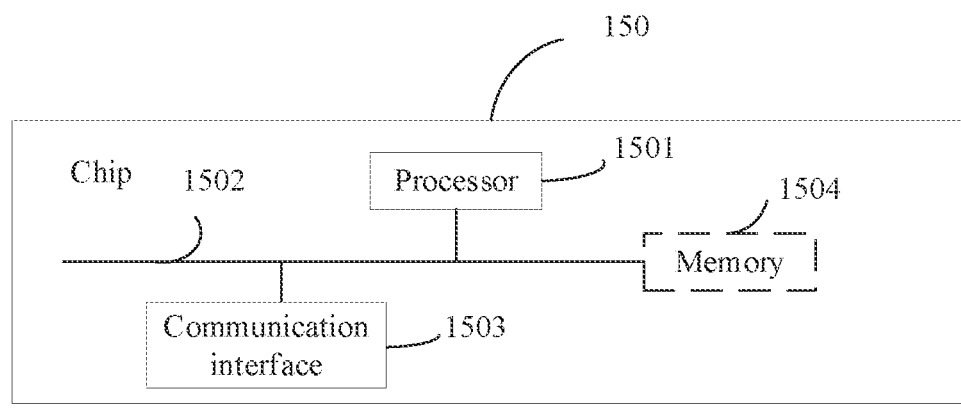
FIG. 15 is a schematic diagram of a structure of a chip according to an embodiment of this application.

FIG. 15 is a schematic diagram of a structure of a chip according to an embodiment of this application. A chip 150 includes one or at least two (including two) processors 1501, a communication line 1502, a communication interface 1503, and a memory 1504.

In some implementations, a memory 1504 stores the following elements: an executable module or a data structure, a subset thereof, or an extended set thereof.

The method described in the foregoing embodiments of this application may be applied to the processor 1501 or implemented by the processor 1501. The processor 1501 may be an integrated circuit chip, and has a signal processing capability. During implementation, the steps of the foregoing methods may be completed by using hardware integrated logic circuits in the processor 1501 or instructions in the form of software. The processor 1501 may be a general-purpose processor (for example, a microprocessor or a conventional processor), a digital signal processor (DSP), an application-specific integrated circuit (ASIC), a field-programmable gate array (FPGA) or another programmable logic device, a discrete gate, a transistor logic device, or a discrete hardware component. The processor 1501 may implement or execute the methods, steps, and logical block diagrams disclosed in embodiments of this application.

The steps of the methods disclosed with reference to embodiments of this application may be directly executed and completed by a hardware decoding processor, or may be executed and completed by using a combination of hardware and software modules in the decoding processor. The software module may be located in a mature storage medium in the art, such as a random access memory, a read-only memory, a programmable read-only memory, or an electrically erasable programmable read-only memory (EEPROM). The storage medium is located in the memory 1504, and the processor 1501 reads information in the memory 1504 and completes the steps in the foregoing methods in combination with hardware of the processor 1501.

The processor 1501, the memory 1504, and the communication interface 1503 may communicate with each other by using the communication line 1502.

In the foregoing embodiment, the instructions stored in the memory and executed by the processor may be implemented in the form of a computer program product. The computer program product may be pre-written in the memory, or may be downloaded and installed in the memory in the form of software.

An embodiment of this application further provides a computer program product, including one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. For example, the usable medium may include a magnetic medium (for example, a floppy disk, a hard disk, or a magnetic tape), an optical medium (for example, a digital versatile disc (DVD)), or a semiconductor medium (for example, a solid state disk (SSD)).

An embodiment of this application further provides a computer-readable storage medium. All or some of methods described in the foregoing embodiments may be implemented by using software, hardware, firmware, or any combination thereof. The computer-readable medium may include a computer storage medium and a communication medium, and may further include any medium that can transfer a computer program from one place to another place. The storage medium may be any target medium accessible to a computer.

In a possible design, the computer-readable medium may include a compact disc read-only memory (CD-ROM), a RAM, a ROM, an EEPROM, or another optical disc memory. The computer-readable medium may include a magnetic disk memory or another magnetic disk storage device. In addition, any connection line may be appropriately referred to as a computer-readable medium. For example, if software is transmitted from a website, a server, or another remote source by using a coaxial cable, an optical fiber cable, a twisted pair, a DSL, or a wireless technology (such as infrared, radio, or microwave), the coaxial cable, the optical fiber cable, the twisted pair, the DSL, or the wireless technology such as infrared, radio, or microwave is included in a definition of a medium. The magnetic disk and optical disc used in this specification include a compact disc (CD), a laser disc, an optical disc, a digital versatile disc (DVD), a floppy disk, and a Blu-ray disc. The magnetic disk usually magnetically reproduces data, and the optical disc optically reproduces data by using a laser.

A combination thereof should also be included in the scope of the computer-readable medium. The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of claims.

What is claimed is:

1. A graphics rendering method, the method comprising:
   performing, by a terminal device, graphics rendering for an application using a target shader;
   obtaining, by the terminal device, a target simplified shader based on a plurality of prestored correspondences and the terminal device determining that the application is run in a complex scene, wherein the complex scene is a scene in which a quantity of instructions for running the application is greater than a first preset threshold, wherein computing resources of the terminal device that are occupied by the target simplified shader are fewer than computing resources of the terminal device that are occupied by the target shader, and wherein the plurality of prestored correspondences comprises a correspondence among information of a shader, hardware information of a device, and a simplified shader, and the information of the shader comprises any one of the shader or an identifier of the shader; and
   performing, by the terminal device, graphics rendering for the application in the complex scene using the target simplified shader;
   wherein the correspondence further comprises a load level, the load level is a quantified value corresponding to load of the terminal device, and the obtaining, by the terminal device, the target simplified shader comprises:
   obtaining, by the terminal device, a quantity of draw calls in the complex scene;
   obtaining, by the terminal device, a target load level based on the quantity of draw calls; and
   obtaining, by the terminal device from the plurality of prestored correspondences, the target simplified shader corresponding to information of the target shader, the target load level, and hardware information of the terminal device.

2. The method according to claim 1, wherein the method further comprises:
   simplifying, by the terminal device, the target shader based on a first preset rule, to obtain a plurality of simplified shaders, wherein the first preset rule comprises at least one of code motion, expression deletion, or syntax simplification, and the plurality of simplified shaders comprises the target simplified shader;

collecting, by the terminal device, status information that is of the terminal device and that exists when the terminal device performs graphics rendering for the application in the complex scene using the plurality of simplified shaders, wherein the status information of the terminal device comprises the load of the terminal device, power consumption of the terminal device, a temperature of the terminal device, a rendering duration, and an image quality of an image rendered by each simplified shader, and the rendering duration is a duration required for performing graphics rendering for the application in the complex scene using each simplified shader; and obtaining, by the terminal device, a correspondence among the information of the target shader, the hardware information of the terminal device, the target load level, and the target simplified shader based on the status information.

3. The method according to claim 2, wherein the obtaining, by the terminal device, the correspondence among the information of the target shader, the hardware information of the terminal device, the target load level, and the target simplified shader based on the status information comprises:

obtaining, by the terminal device, a plurality of target rendering durations from the status information, wherein each target rendering duration of the plurality of target rendering durations is less than a second preset threshold;

obtaining, by the terminal device, target status information from the status information corresponding to the plurality of target rendering durations, wherein an image quality in the target status information is greater than a third preset threshold, and the target status information is status information that is of the terminal device and that exists when graphics rendering is performed for the application in the complex scene using the target simplified shader;

obtaining, by the terminal device, the target load level based on load of the terminal device in the target status information; and establishing, by the terminal device, the correspondence among the information of the target shader, the hardware information of the terminal device, the target load level, and the target simplified shader.

4. The method according to claim 2, wherein the obtaining, by the terminal device, the correspondence among the information of the target shader, the hardware information of the terminal device, the target load level, and the target simplified shader based on the status information comprises:

obtaining, by the terminal device, a plurality of target image qualities from the status information, wherein each target image quality of the plurality of target image qualities is greater than a fourth preset threshold;

obtaining, by the terminal device, target status information from the status information corresponding to the plurality of target image qualities, wherein a rendering duration in the target status information is less than a fifth preset threshold, and the target status information is status information that is of the terminal device and that exists when graphics rendering is performed for the application in the complex scene using the target simplified shader;

obtaining, by the terminal device, the target load level based on load of the terminal device in the target status information; and establishing, by the terminal device, the correspondence among the information of the target shader, the hardware information of the terminal device, the target load level, and the target simplified shader.

5. The method according claim 1, wherein the method further comprises:

receiving, by the terminal device, the plurality of prestored correspondences from another device.

6. A non-transitory computer-readable storage medium, wherein the computer-readable storage medium stores instructions, and when the instructions are executed by a processor, a terminal device is enabled to:

perform graphics rendering for an application using a target shader;

obtain a target simplified shader based on a plurality of prestored correspondences and the terminal device determining that the application is run in a complex scene, wherein the complex scene is a scene in which a quantity of instructions for running the application is greater than a first preset threshold, wherein computing resources of the terminal device that are occupied by the target simplified shader are fewer than computing resources of the terminal device that are occupied by the target shader, and wherein the plurality of prestored correspondences comprises a correspondence among information of a shader, hardware information of a device, and a simplified shader, and the information of the shader comprises any one of the shader or an identifier of the shader; and perform graphics rendering for the application in the complex scene using the target simplified shader;

wherein the correspondence further comprises a load level, the load level is a quantified value corresponding to load of the terminal device, and the obtaining the target simplified shader comprises:

obtaining a quantity of draw calls in the complex scene;

obtaining a target load level based on the quantity of draw calls; and obtaining, from the plurality of prestored correspondences, the target simplified shader corresponding to information of the target shader, the target load level, and hardware information of the terminal device.

7. The computer-readable storage medium according to claim 6, wherein when the instructions are executed by the processor, the terminal device is further enabled to:

simplify the target shader based on a first preset rule, to obtain a plurality of simplified shaders, wherein the first preset rule comprises at least one of code motion, expression deletion, or syntax simplification, and the plurality of simplified shaders comprises the target simplified shader;

collect status information that is of the electronic device and that exists when the electronic device performs graphics rendering for the application in the complex scene using the plurality of simplified shaders, wherein the status information of the electronic device comprises the load of the electronic device, power consumption of the electronic device, a temperature of the electronic device, a rendering duration, and an image quality of an image rendered by each simplified shader, and the rendering duration is a duration required for performing graphics rendering for the application in the complex scene using each simplified shader; and obtain a correspondence among the information of the target shader, the hardware information of the electronic device, the target load level, and the target simplified shader based on the status information.

8. The computer-readable storage medium according to claim 7, wherein the obtaining the correspondence among the information of the target shader, the hardware information of the electronic device, the target load level, and the target simplified shader based on the status information comprises:
obtaining a plurality of target rendering durations from the status information, wherein each target rendering duration of the plurality of target rendering durations is less than a second preset threshold;
obtaining target status information from the status information corresponding to the plurality of target rendering durations, wherein an image quality in the target status information is greater than a third preset threshold, and the target status information is status information that is of the electronic device and that exists when graphics rendering is performed for the application in the complex scene using the target simplified shader;
obtaining the target load level based on load of the electronic device in the target status information; and
establishing the correspondence among the information of the target shader, the hardware information of the electronic device, the target load level, and the target simplified shader.

9. The computer-readable storage medium according to claim 7, wherein the obtaining the correspondence among the information of the target shader, the hardware information of the electronic device, the target load level, and the target simplified shader based on the status information comprises:
obtaining a plurality of target image qualities from the status information, wherein each target image quality of the plurality of target image qualities is greater than a fourth preset threshold;
obtaining target status information from the status information corresponding to the plurality of target image qualities, wherein a rendering duration in the target status information is less than a fifth preset threshold, and the target status information is status information that is of the electronic device and that exists when graphics rendering is performed for the application in the complex scene using the target simplified shader;
obtaining the target load level based on load of the electronic device in the target status information; and
establishing the correspondence among the information of the target shader, the hardware information of the electronic device, the target load level, and the target simplified shader.

10. The computer-readable storage medium according to claim 6, wherein when the instructions are executed by the processor, the terminal device is further enabled to:
receive the plurality of prestored correspondences from another device.

11. An electronic device, comprising:
a memory configured to store a computer program; and
a processor, wherein when the computer program is executed by the processor, the electronic device is enabled to:
perform graphics rendering for an application using a target shader;
obtain a target simplified shader based on a plurality of prestored correspondences and the terminal device determining that the application is run in a complex scene, wherein the complex scene is a scene in which a quantity of instructions for running the application is greater than a first preset threshold, wherein computing resources of the terminal device that are occupied by the target simplified shader are fewer than computing resources of the terminal device that are occupied by the target shader, and wherein the plurality of prestored correspondences comprises a correspondence among information of a shader, hardware information of a device, and a simplified shader, and the information of the shader comprises any one of the shader or an identifier of the shader; and
perform graphics rendering for the application in the complex scene using the target simplified shader;
wherein the correspondence further comprises a load level, the load level is a quantified value corresponding to load of the electronic device, and the obtaining the target simplified shader comprises:
obtaining a quantity of draw calls in the complex scene;
obtaining a target load level based on the quantity of draw calls; and
obtaining from the plurality of prestored correspondences the target simplified shader corresponding to information of the target shader, the target load level, and hardware information of the electronic device.

12. The electronic device according to claim 11, wherein when the computer program is executed by the processor, the electronic device is further enabled to:
simplify the target shader based on a first preset rule, to obtain a plurality of simplified shaders, wherein the first preset rule comprises at least one of code motion, expression deletion, or syntax simplification, and the plurality of simplified shaders comprises the target simplified shader;
collect status information that is of the electronic device and that exists when the electronic device performs graphics rendering for the application in the complex scene using the plurality of simplified shaders, wherein the status information of the electronic device comprises the load of the electronic device, power consumption of the electronic device, a temperature of the electronic device, a rendering duration, and an image quality of an image rendered by each simplified shader, and the rendering duration is a duration required for performing graphics rendering for the application in the complex scene using each simplified shader; and
obtain a correspondence among the information of the target shader, the hardware information of the electronic device, the target load level, and the target simplified shader based on the status information.

13. The electronic device according to claim 12, wherein the obtaining the correspondence among the information of the target shader, the hardware information of the electronic device, the target load level, and the target simplified shader based on the status information comprises:
obtaining a plurality of target rendering durations from the status information, wherein each target rendering duration of the plurality of target rendering durations is less than a second preset threshold;
obtaining target status information from the status information corresponding to the plurality of target rendering durations, wherein an image quality in the target status information is greater than a third preset threshold, and the target status information is status information that is of the electronic device and that exists when graphics rendering is performed for the application in the complex scene using the target simplified shader;

obtaining the target load level based on load of the electronic device in the target status information; and establishing the correspondence among the information of the target shader, the hardware information of the electronic device, the target load level, and the target simplified shader.

14. The electronic device according to claim 12, wherein the obtaining the correspondence among the information of the target shader, the hardware information of the electronic device, the target load level, and the target simplified shader based on the status information comprises:

obtaining a plurality of target image qualities from the status information, wherein each target image quality of the plurality of target image qualities is greater than a fourth preset threshold;

obtaining target status information from the status information corresponding to the plurality of target image qualities, wherein a rendering duration in the target status information is less than a fifth preset threshold, and the target status information is status information that is of the electronic device and that exists when graphics rendering is performed for the application in the complex scene using the target simplified shader;

obtaining the target load level based on load of the electronic device in the target status information; and establishing the correspondence among the information of the target shader, the hardware information of the electronic device, the target load level, and the target simplified shader.

15. The electronic device according to claim 11, wherein when the computer program is executed by the processor, the electronic device is further enabled to:

receive the plurality of prestored correspondences from another device.

* * * * *